(12) United States Patent
Dudar et al.

(10) Patent No.: US 9,937,786 B2
(45) Date of Patent: Apr. 10, 2018

(54) FUEL TANK BAFFLE WITH PIVOTABLE VANES

(71) Applicant: Ford Global Technologies, LLC, Dearborn, MI (US)

(72) Inventors: Aed M. Dudar, Canton, MI (US); Dennis Seung-Man Yang, Canton, MI (US); Rob Ognjanovski, Jr., Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 14/746,586

(22) Filed: Jun. 22, 2015

(65) Prior Publication Data
US 2016/0368373 A1    Dec. 22, 2016

(51) Int. Cl.
*B60K 15/077*   (2006.01)
*B60K 15/03*    (2006.01)

(52) U.S. Cl.
CPC ............ *B60K 15/077* (2013.01); *B60K 15/03* (2013.01); *B60K 2015/0344* (2013.01); *B60K 2015/0777* (2013.01)

(58) Field of Classification Search
CPC .................. B60K 15/03; B60K 15/077; B60K 2015/0344; B60K 2015/0777
USPC ............................................................ 141/5
See application file for complete search history.

(56) References Cited

U.S. PATENT DOCUMENTS

| 5,031,795 | A | 7/1991 | Kotera et al. | |
|---|---|---|---|---|
| 5,850,933 | A | 12/1998 | Pazik | |
| 6,260,644 | B1 * | 7/2001 | Otsu | B60K 6/383 180/165 |
| 7,104,347 | B2 * | 9/2006 | Severinsky | B60H 1/004 180/65.23 |
| 7,261,323 | B2 * | 8/2007 | Grant | B60K 15/077 137/574 |
| 8,783,287 | B2 | 7/2014 | Matusek et al. | |
| 2002/0185492 | A1 * | 12/2002 | Krogull | B60K 15/077 220/4.14 |
| 2011/0155107 | A1 * | 6/2011 | Lin | F02M 25/0854 123/519 |
| 2013/0291985 | A1 * | 11/2013 | Vreeken | B60K 15/077 138/40 |

FOREIGN PATENT DOCUMENTS

| KR | 20070003405 A | 1/2007 |
|---|---|---|
| KR | 20070040234 | 4/2007 |
| KR | 20130070946 A | 6/2013 |

* cited by examiner

*Primary Examiner* — Timothy L Maust
*Assistant Examiner* — Andrew Schmid
(74) *Attorney, Agent, or Firm* — Julia Voutyras; McCoy Russell LLP

(57) ABSTRACT

Methods and systems are provided for regulating fuel flow in a fuel tank. In one example, a method may comprise fueling a fuel tank by receiving a nozzle into a filler tube which extends into a fuel tank to fuel the fuel tank, and directing fuel through the tube against vanes in a baffle which forms a compartment within the tank. Additionally, the method may comprise enabling the vanes to open so that pressure within the compartment remains below a level which would otherwise cause shut off the nozzle during the fueling.

11 Claims, 8 Drawing Sheets

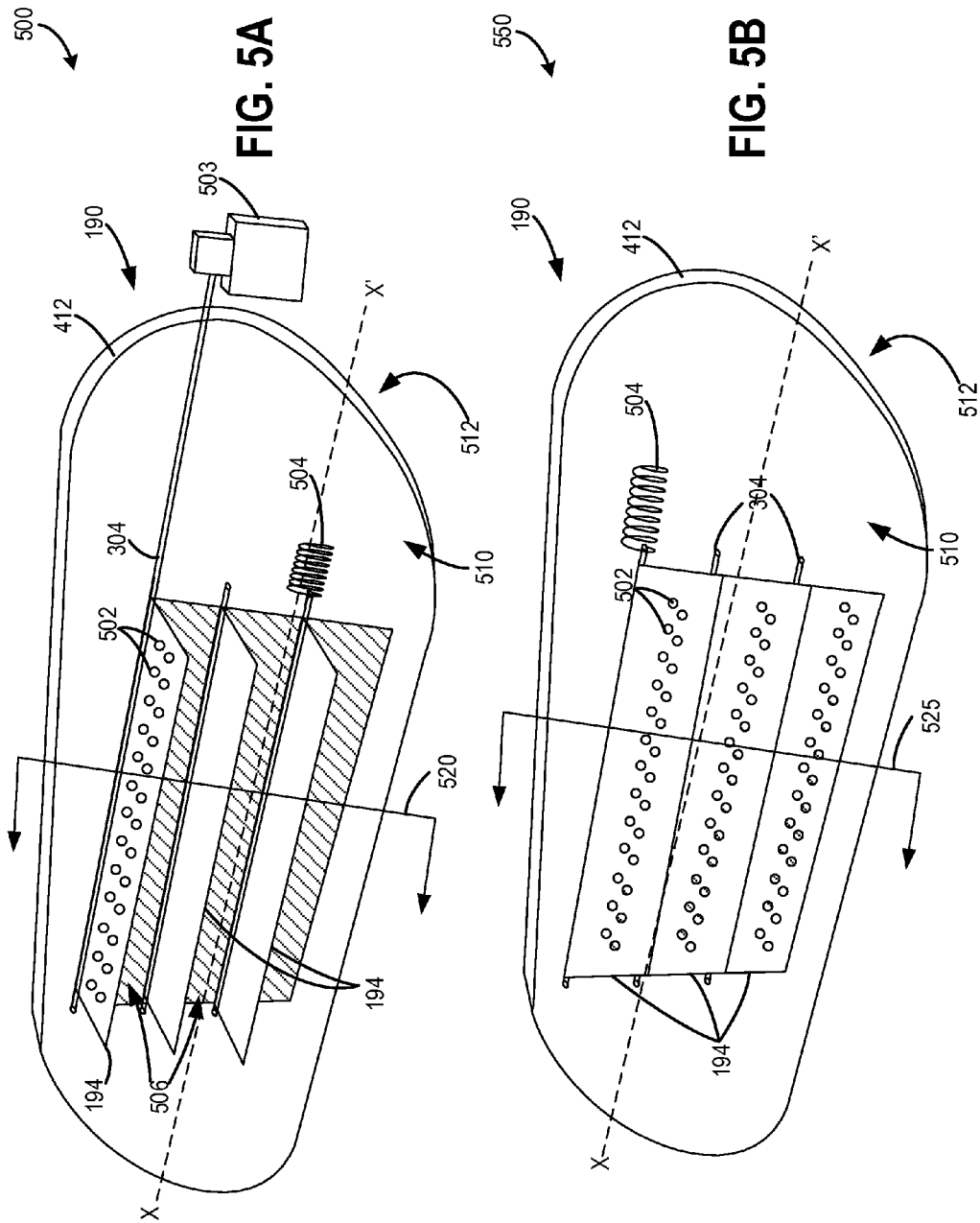

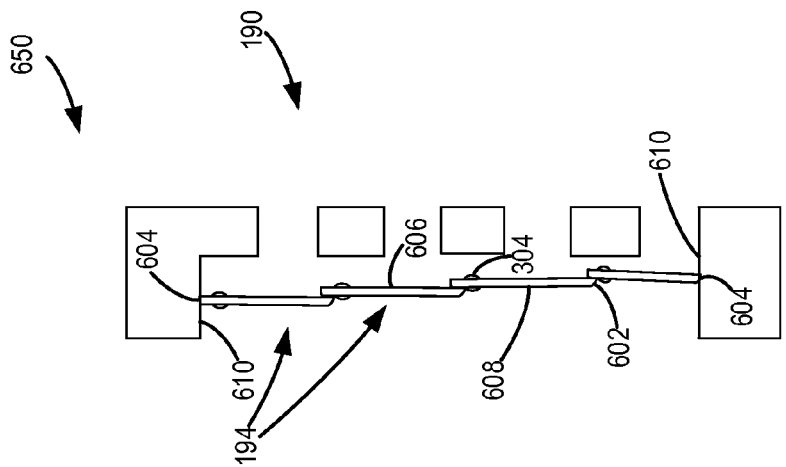
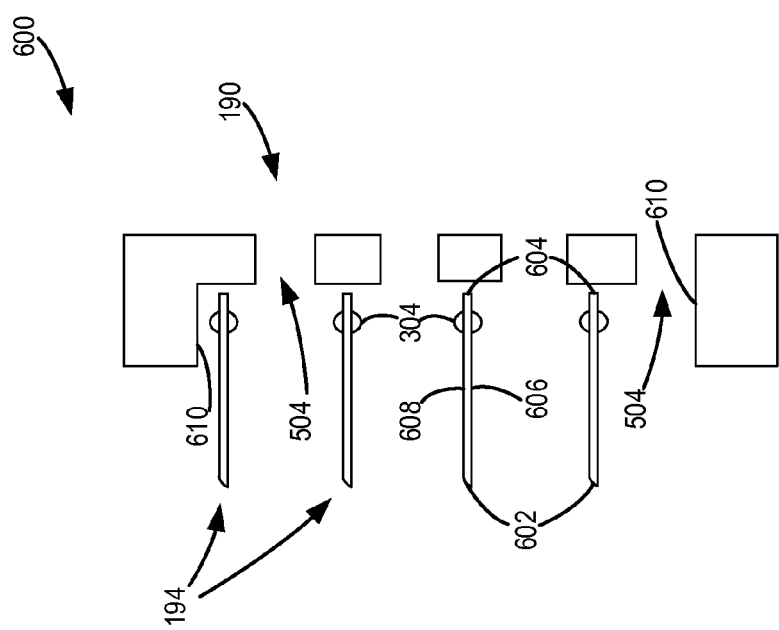

FUEL TANK BAFFLE WITH PIVOTABLE VANES

FIELD

The present description relates generally to a vehicle fuel system.

BACKGROUND/SUMMARY

Fuel tanks may be utilized in vehicle systems for storing fuel to be used during combustion in an engine of the vehicle system. During vehicle operation, fuel may be displaced within the fuel tank due to changes in velocity of the vehicle, such as during cornering, braking, and acceleration. When displaced, fuel may impact walls of the tank and generate noise. Noise produced by these impacts may be more apparent with hybrid vehicles, since they may operate with minimal interior noise when fuel combustion is deactivated. As such, liquid fuel tanks for automotive vehicles are designed with various constructions to reduce noise, vibration and ride harshness generated by the motion of fuel within the fuel tank.

For example, U.S. Pat. No. 5,850,933 discloses a fuel tank including one or more baffles, which extend between opposite ends of the tank so as to restrict fuel flow within the tank. As such, the impact force and therefore the noise produced from fuel hitting the walls of the fuel tank may be reduced. Further, many fuel tanks comprise baffles constructed with holes, so that fuel may still flow through the baffle, but in a restricted manner. In this way, the velocity of fuel with respect to the fuel tank may be attenuated while maintaining the overall storage volume of the tank.

However, the inventors herein have recognized potential issues with such fuel tank systems. As an example, during refueling, the baffles may restrict the flow of fuel into the fuel tank. Specifically, fuel entering the fuel tank may bounce off the baffle wall and spray back towards the refueling nozzle. Thus, the baffle wall may act as a flow restriction for fuel entering the tank during refueling. Fuel entering the tank may therefore be impeded and/or confined by the baffle wall. This may result in elevated pressures and/or liquid levels on the refueling side of the baffle as compared to regions of the fuel tank on the opposite side of the baffle. As such, the fuel pump may be shut off before the fuel tank is filled. In another example, vapor pressure in the fuel tank may increase due to the fuel bouncing off the baffle wall. Increases in the fuel tank pressure may result in corresponding rises in loading of a fuel vapor storage canister of the fuel tank system.

In one example, the issues described above may be at least partly addressed by a method for receiving a nozzle into a filler tube which may extend into a fuel tank to fuel the fuel tank, and directing fuel through said tube against vanes in a baffle which may form a compartment within said tank and during said fueling, enabling said vanes to open so that pressure within said compartment may remain below a level which may otherwise cause shut off said nozzle.

In some examples, enabling said vanes to open may comprise a mechanical release of said vanes in response to insertion of said nozzle. However, in other examples, enabling of said vanes to open may comprise an electro-mechanical release of said vanes by a relay in response to insertion of said nozzle. In still further examples enabling said vanes to open may comprise pressure exerted by said fuel acting against said vanes during said fueling which may be sufficient to overcome a weight of said vanes which may be exerting a closing force on said vanes.

In another representation, the issues described above may be at least partly addressed by a method comprising fueling a fuel tank by receiving a nozzle into a filler tube which may extend into said tank and directing fuel through said tube against vanes in a baffle which may form a compartment within said tank, where said vanes may include a plurality of holes to allow a portion of said fuel to flow therethrough. During said fueling, the method may additionally or alternatively comprise enabling said vanes to open so that pressure within said compartment may remain below a level which would otherwise cause shut off said nozzle.

In further examples, the method may comprise routing fuel vapors from said tank into a fuel vapor recovery system. In another example, the method may comprise supplying said fuel from said tank to an internal combustion engine. In yet other examples, the method may additionally or alternatively comprise periodically purging at least a portion of said fuel vapors from said tank and said fuel vapor recovery system into said engine. In some examples, internal combustion may drive a motor vehicle and said baffle may reduce sloshing of said fuel and generation of said fuel vapors while said motor vehicle is being driven.

In this way, fuel tank noise may be reduced, while the storage capacity of the fuel tank may be increased. By including baffles with adjustable vanes, the fuel tank may still offer the same sound reduction benefits of conventional fuel tank systems, while also reducing premature refueling shutoffs and fuel vapor canister loading. During refueling, the vanes may be adjusted to a first position so that fuel may flow to the extremities of the tank, relatively unrestricted. In this way, the amount of fuel impacting the baffle during refueling may be reduced. As a result, vapor pressure in the fuel tank, and canister loading may be reduced. However, after refueling, the baffles may be adjusted to a closed second position, so that movement of fuel within the fuel tank may be restricted and therefore noise produced from the fuel sloshing around in the fuel tank may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A illustrates a side perspective view of a baffle comprising which may be included in the fuel tank of FIGS. 3-4 comprising one or more vanes in an open first position.

FIG. 5B illustrates a side perspective view of a baffle which may be included in the fuel tank of FIGS. 3-4 comprising one or more vanes in a closed second position.

FIG. 6A illustrates a cross-sectional view of the baffle shown in FIG. 5A with the vanes in the open first position.

FIG. 6B illustrates a cross-sectional view of the baffle shown in FIG. 5B with the vanes in the closed second position.

DETAILED DESCRIPTION

Figure 1:
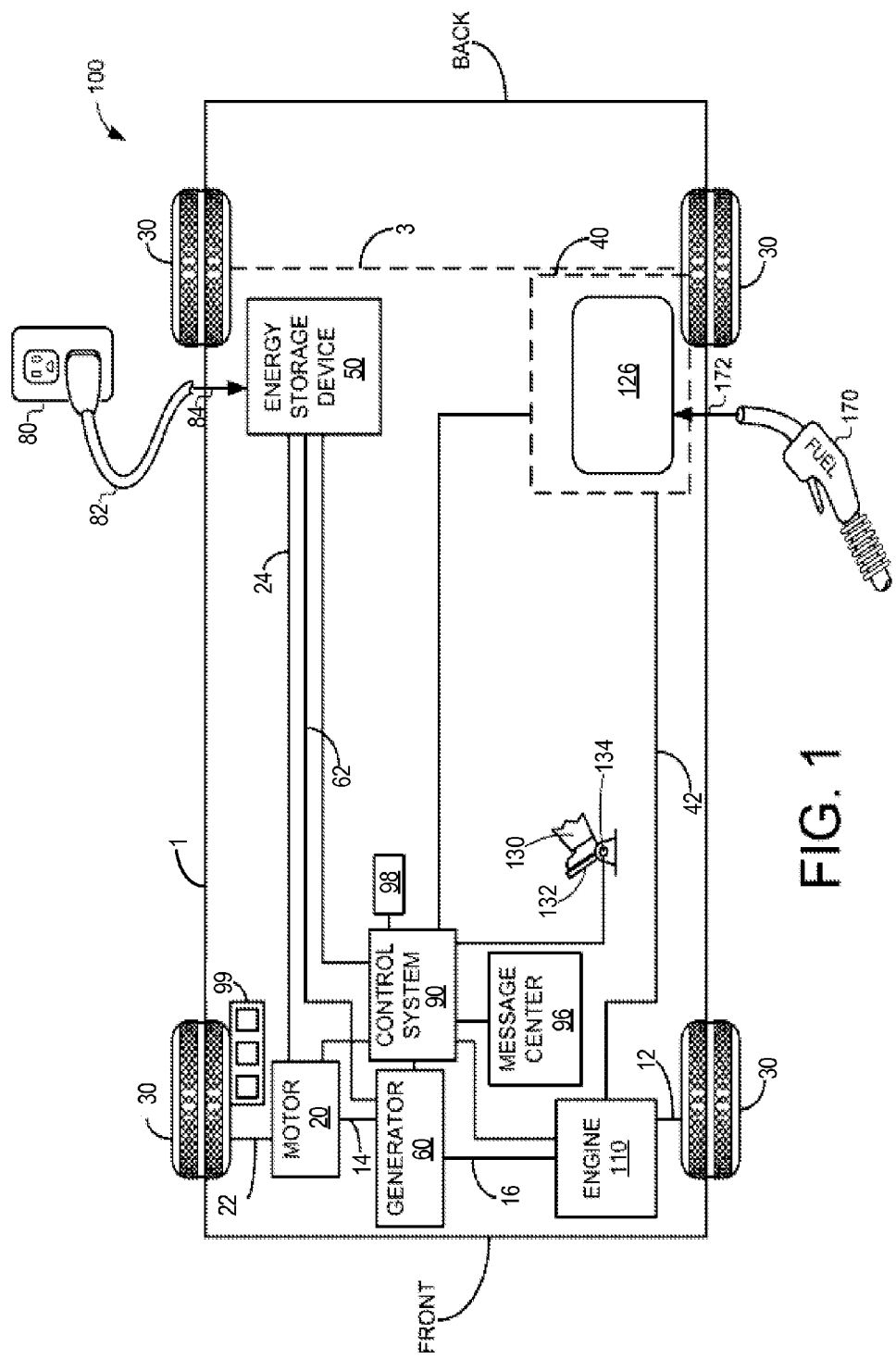
FIG. 1 shows a schematic diagram of an example vehicle system.
Figure 2:
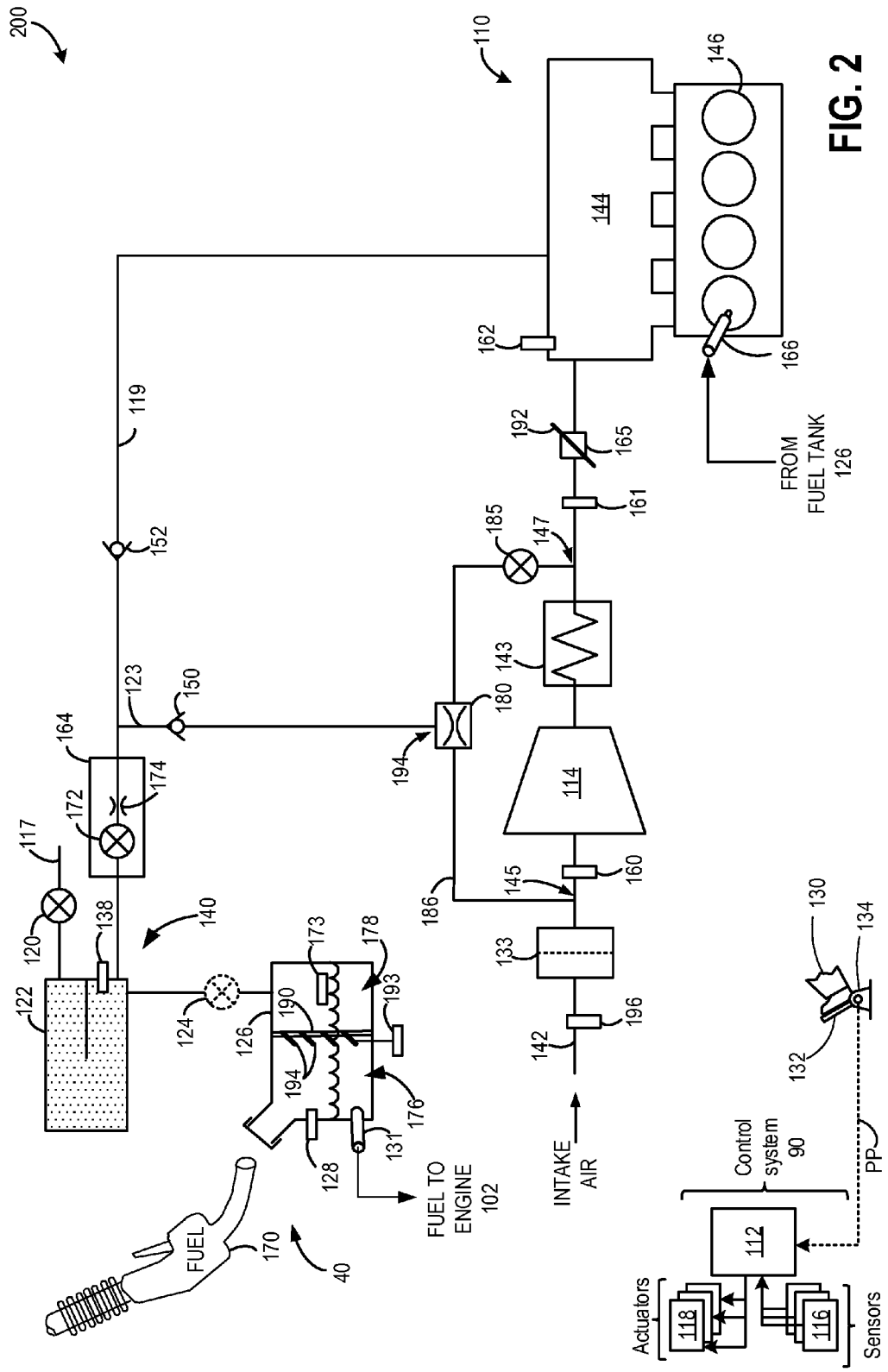
FIG. 2 shows a schematic diagram of an example engine system which may be included in the vehicle system of FIG. 1.
Figure 3:
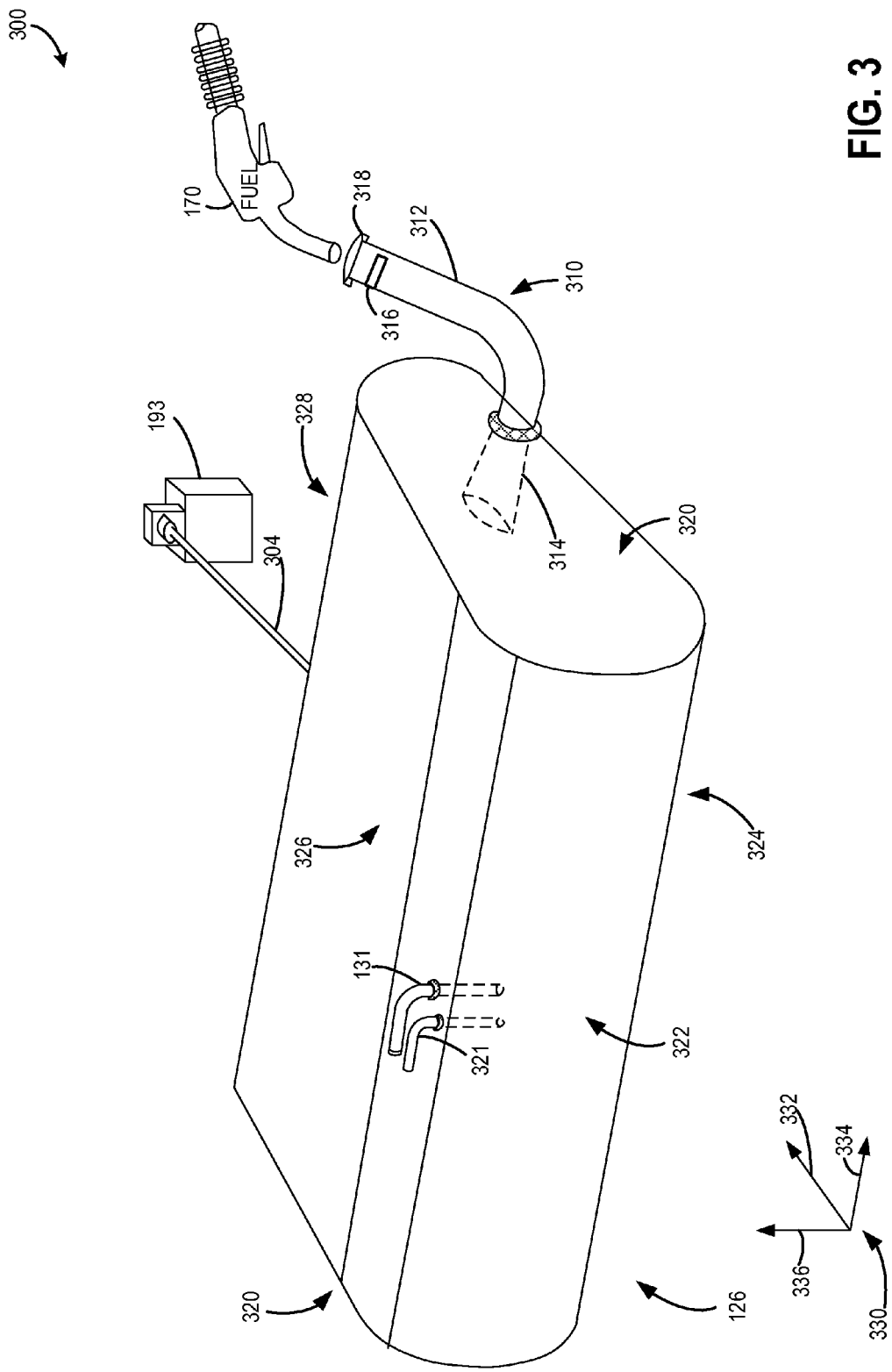
FIG. 3 illustrates an exterior side perspective view of an embodiment of a fuel tank which may be included in the vehicle system of FIG. 1 and/or engine system of FIG. 2.
Figure 4:
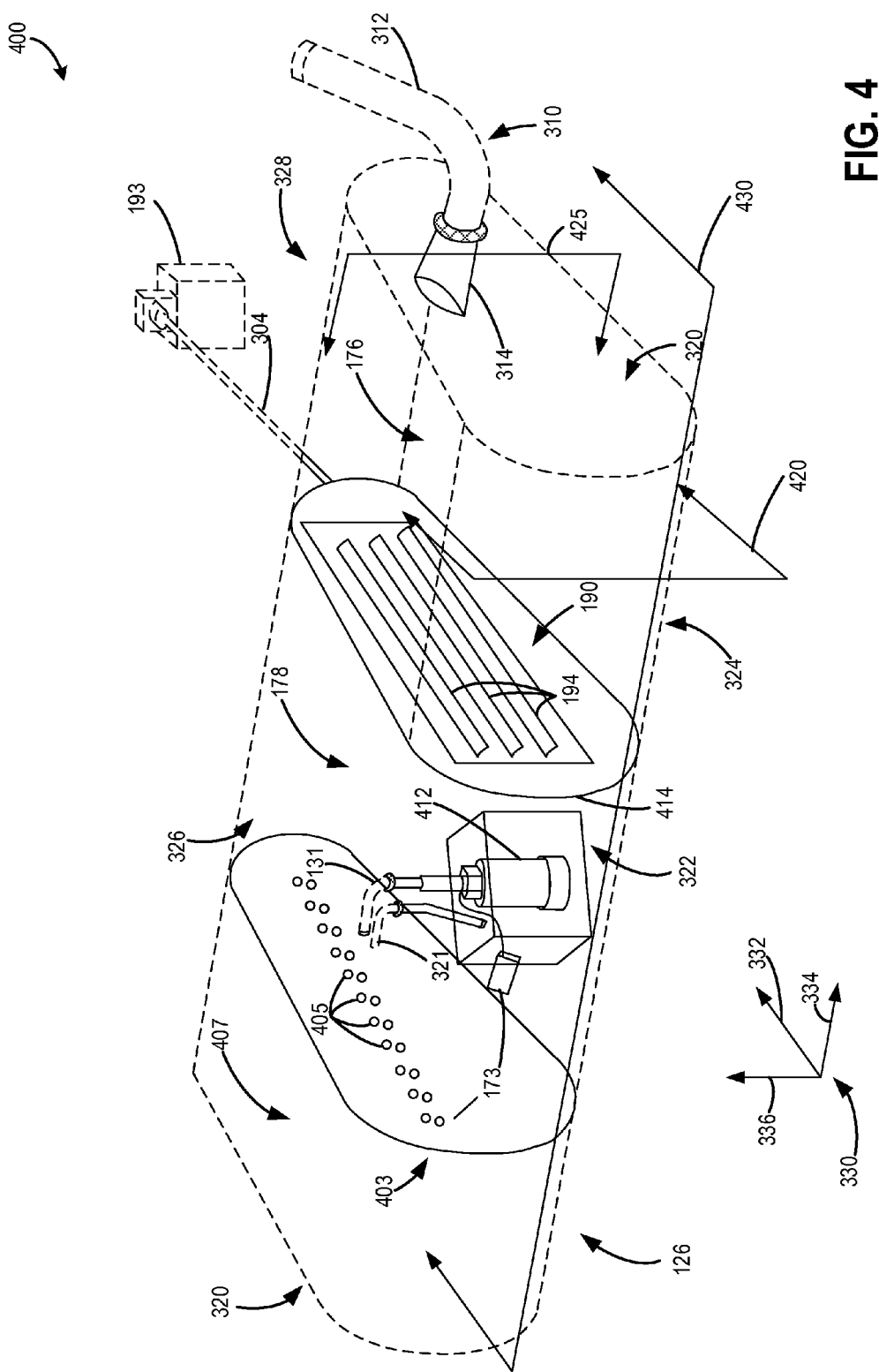
FIG. 4 illustrates an interior side perspective view of the fuel tank of FIG. 3.

The following description relates to systems and methods for regulating fuel flow within a fuel tank. A vehicle system, such as the vehicle system shown in FIG. 1, may comprise an engine for propelling the vehicle system. In some examples, the vehicle system may be a hybrid electric vehicle (HEV) and may also include a battery and/or motor for propelling the vehicle system. Thus, either the battery or the engine, or both, may provide power to the vehicle system. An example engine system that may be included in the vehicle system is shown in FIG. 2. Liquid fuel used for combustion by the engine, may be stored in a fuel tank (FIGS. 1-2). Example fuel tanks are shown in FIGS. 3-4.

The fuel tanks may comprise one or more baffles for restricting the flow of fuel within the tank. As shown in the example baffles of FIGS. 5A-5B, the baffles may comprise one or more adjustable vanes, which may be adjusted between an open first position and a closed second position. Example open and closed vane positions are shown in FIGS. 6A-6B. As described in the example method in FIGS. 7-8, the position of the vanes, and therefore the flow of fuel within the fuel tank, may be adjusted based on vehicle and/or engine operating conditions. Specifically, the vanes may be adjusted to the open first position during refueling, and otherwise may be adjusted to the closed second position. In this way, the vane-containing baffle may restrict fuel flow within the fuel tank while the vehicle system is being driven, thus mitigating noise produced by the fuel tank. However, pressure in the fuel tank may be reduced during refueling by adjusting the vanes to the open first position, thereby allowing relatively unrestricted flow of fuel in the fuel tank.

FIG. 1 illustrates an example vehicle system 100 as shown from a top view. Vehicle system 100 includes a vehicle body 1 with a front end, labeled "FRONT", and a back end labeled "BACK." Vehicle system 100 may include a plurality of wheels 30. For example, as shown in FIG. 1, vehicle system 100 may include a first pair of wheels adjacent to the front end of the vehicle and a second pair of wheels adjacent the back end of the vehicle. Forward motion of the vehicle should be understood to mean motion of the vehicle toward the front end of the vehicle and backward motion of the vehicle should be understood to mean motion of the vehicle toward the back end of the vehicle.

Vehicle system 100 includes a fuel burning engine 110 and a motor 20. As a non-limiting example, engine 110 comprises an internal combustion engine and motor 20 comprises an electric motor. Motor 20 may be configured to utilize or consume a different energy source than engine 110. For example, engine 110 may consume a liquid fuel (e.g., gasoline) to produce an engine output while motor 20 may consume electrical energy to produce a motor output. As such, a vehicle system 100 may be referred to as a hybrid electric vehicle (HEV).

Vehicle system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 20 may propel the vehicle via drive wheel 30 as indicated by line 22 while engine 110 is deactivated.

During other operating conditions, engine 110 may be set to a deactivated state (as described above) while motor 20 may be operated to charge energy storage device 50. For example, motor 20 may receive wheel torque from drive wheel 30 as indicated by line 22 where the motor may convert the kinetic energy of the vehicle to electrical energy for storage at energy storage device 50 as indicated by line 24. This operation may be referred to as regenerative braking of the vehicle. Thus, motor 20 can provide a generator function in some embodiments. However, in other embodiments, generator 60 may instead receive wheel torque from drive wheel 30, where the generator may convert the kinetic energy of the vehicle to electrical energy for storage at energy storage device 50 as indicated by line 62.

During still other operating conditions, engine 110 may be operated by combusting fuel received from fuel system 40 as indicated by line 42. For example, engine 110 may be operated to propel the vehicle via drive wheel 30 as indicated by line 12 while motor 20 is deactivated. During other operating conditions, both engine 110 and motor 20 may each be operated to propel the vehicle via drive wheel 30 as indicated by lines 12 and 22, respectively. A configuration where both the engine and the motor may selectively propel the vehicle may be referred to as a parallel type vehicle propulsion system. Note that in some embodiments, motor 20 may propel the vehicle via a first set of drive wheels and engine 110 may propel the vehicle via a second set of drive wheels.

In other embodiments, vehicle propulsion system 100 may be configured as a series type vehicle system, whereby the engine does not directly propel the drive wheels. Rather, engine 110 may be operated to power motor 20, which may in turn propel the vehicle via drive wheel 30 as indicated by line 22. For example, during select operating conditions, engine 110 may drive generator 60, which may in turn supply electrical energy to one or more of motor 20 as indicated by line 14 or energy storage device 50 as indicated by line 62. As another example, engine 110 may be operated to drive motor 20 which may in turn provide a generator function to convert the engine output to electrical energy, where the electrical energy may be stored at energy storage device 50 for later use by the motor. As yet another example, engine 110 may be operated to drive generator 60, which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 126 for storing fuel on-board the vehicle. For example, fuel tank 126 may store one or more liquid fuels, including but not limited to: gasoline, diesel, and alcohol fuels. In some examples, the fuel may be stored on-board the vehicle as a blend of two or more different fuels. For example, fuel tank 126 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by line 42. Still other suitable fuels or fuel blends may be supplied to engine 110, where they may be combusted at the engine to produce an engine output. The engine output may be utilized to propel the vehicle as indicated by line 12 or to recharge energy storage device 50 via motor 20 or generator 60.

In some examples, as shown in FIG. 1, fuel tank 126 may be packaged in the vehicle adjacent to a wheel axle, e.g., adjacent to wheel axle 3 towards the back side of the vehicle. However, in other examples, fuel tank 126 may be positioned in another region of the vehicle, e.g., adjacent to a front axle or other location. Further, as described in more detail below, in some examples, fuel tank 126 may have a shelf tank design where a depth of a first region of the fuel tank, e.g., a rear region of the fuel tank, is less than a depth of a second region of the tank, e.g., a front region. Further, fuel tank 126 may include a plurality of components, such as support structures and one or more fuel pumps.

For example, fuel tank 126 may be substantially composed of a plastic and may include reinforcement elements therein. However, in other examples, fuel tank 126 may be substantially composed of a metal and/or alloy, and may include reinforcement elements therein. In still further examples, the fuel tank 126 may be composed of both plastic and metal. Further, as described in detail below with regard to FIGS. 4-5, fuel tank 126 may include one or more baffles coupled to walls of the fuel tank to assist in dampening waves of liquid fuel within the tank during vehicle motion. In some embodiments, the fuel tank 126 may include a baffle positioned oblique and/or perpendicular to longitudinal waves flowing in the tank 126. The baffle may be coupled to long and short vertical walls of the fuel tank, and may include undulations being wave-shaped. Further still, other shapes may be used, if desired as will be described in greater detail below with reference to FIGS. 4-5.

In some embodiments, energy storage device 50 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 50 may include one or more batteries and/or capacitors.

Control system 90 may communicate with one or more of engine 110, motor 20, fuel system 40, energy storage device 50, and generator 60. Control system 90 may receive sensory feedback information from one or more of engine 110, motor 20, fuel system 40, energy storage device 50, and generator 60. Further, control system 90 may send control signals to one or more of engine 110, motor 20, fuel system 40, energy storage device 50, and generator 60 responsive to this sensory feedback. Control system 90 may receive an indication of an operator requested output of the vehicle propulsion system from a vehicle operator 130. For example, control system 90 may receive sensory feedback from pedal position sensor 134 which communicates with input device 132. Input device 132 may refer schematically to a brake pedal and/or an accelerator pedal.

Energy storage device 50 may periodically receive electrical energy from a power source 80 residing external to the vehicle (e.g., not part of the vehicle) as indicated by line 84. As a non-limiting example, vehicle system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may disconnected between power source 80 and energy storage device 50. Control system 90 may identify and/or control the amount of electrical energy stored at the energy storage device, which may be referred to as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from a power source that does not comprise part of the vehicle. In this way, motor 20 may propel the vehicle by utilizing an energy source other than the fuel utilized by engine 110.

Fuel system 40 may periodically receive fuel from a fuel source residing external to the vehicle. As a non-limiting example, vehicle system 100 may be refueled by receiving fuel via a fuel dispensing nozzle 170 as indicated by line 172. In some embodiments, fuel tank 126 may be configured to store the fuel received from fuel dispensing nozzle 170 until it is supplied to engine 110 for combustion. In some embodiments, control system 90 may receive an indication of the level of fuel stored at fuel tank 126 via a fuel level sensor as described in greater detail below with reference to FIGS. 2-4. The level of fuel stored at fuel tank 126 (e.g., as identified by the fuel level sensor) may be communicated to the vehicle operator, for example, via a fuel gauge or indication lamp indicated at 96.

Vehicle system 100 may be configured to utilize a secondary form of energy (e.g., electrical energy) that is periodically received from an energy source that is not otherwise part of the vehicle.

The vehicle system 100 may also include a message center 96, ambient temperature/humidity sensor 98, and a roll stability control sensor, such as a lateral and/or longitudinal and/or yaw rate sensor(s) 99. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display.

It should be understood that though FIG. 1 shows a plug-in hybrid electric vehicle, in other examples, vehicle system 100 may be a hybrid vehicle without plug-in components. Further, in other examples, vehicle system 100 may not be a hybrid vehicle but may be another type of vehicle with other propulsion mechanisms, e.g., a vehicle with a gasoline engine or a diesel engine which may or may not include other propulsion systems. Thus, in some examples, vehicle system 100 may be powered by only by engine 110, and not by energy storage device 50 and/or motor 20.

Referring now to FIG. 2, it shows aspects of an example engine system 200 which may be included in an automotive vehicle such as the vehicle system 100 shown above with reference to FIG. 1. Thus, components introduced in the vehicle system 100, such as engine 110, may be the same as components in engine system 200. As such, components of engine system 200 already introduced in FIG. 1, may not be reintroduced in the description of FIG. 2. The engine system 200 is configured for combusting fuel vapor accumulated in at least one component thereof. Engine system 200 includes a multi-cylinder internal combustion engine, generally depicted at 110, which may propel the automotive vehicle. Engine 110 may be controlled at least partially by control system 90 which may include a controller 112 and by input from vehicle operator 130 via an input device 132. Control system 90 may also include pedal position sensor 134 for generating a proportional pedal position signal PP.

Engine 110 includes an intake throttle 165 fluidly coupled to an intake manifold 144 along an intake passage 142. Air may enter intake passage 142 from an air intake system (AIS) including an air cleaner 133 in communication with the vehicle's environment. Intake throttle 165 may include throttle plate 192. In this particular example, the position of throttle plate 192 may be varied by controller 112 via a signal provided to an electric motor or actuator included with intake throttle 165, a configuration that is commonly referred to as electronic throttle control (ETC). In this manner, intake throttle 165 may be operated to vary the intake air provided to intake manifold 144 and the plurality of cylinders therein.

A barometric pressure sensor 196 may be coupled at an inlet of intake passage 142 for providing a signal regarding barometric pressure (BP). A manifold air pressure sensor 162 may be coupled to intake manifold 144 for providing a signal regarding manifold air pressure (MAP) to controller 112. A throttle inlet pressure sensor 161 may be coupled immediately upstream of intake throttle 165 for providing a signal regarding throttle inlet pressure (TIP) or boost pressure.

Intake manifold 144 is configured to supply intake air or an air-fuel mixture to a plurality of combustion chambers 164 (also termed, cylinders 164) of engine 110. The combustion chambers 164 may be arranged above a lubricant-filled crankcase (not shown), in which reciprocating pistons of the combustion chambers rotate a crankshaft (not shown). Combustion chambers 164 may be supplied one or more fuels via fuel injectors 166. Fuels may include gasoline, alcohol fuel blends, diesel, biodiesel, compressed natural gas, etc. Fuel may be supplied to the combustion chambers via direct injection (as shown in FIG. 2), port injection, throttle valve-body injection, or any combination thereof. It will be noted that a single fuel injector 166 is depicted in FIG. 2 and though not shown, each combustion chamber 164 may be coupled with a respective fuel injector 166. In the combustion chambers, combustion may be initiated via spark ignition and/or compression ignition. Further, exhaust gases from combustion chambers 164 may exit engine 110 via an exhaust manifold (not shown) into an emission control device (not shown) coupled to an exhaust passage (not shown).

Engine system 200 may further include a compressor 114 for providing a boosted intake air charge to intake manifold 144. In the example of a turbocharger compressor, compressor 114 may be mechanically coupled to and driven by an exhaust turbine (not shown) powered by exhaust gases flowing from the engine. The exhaust turbine may be positioned in the exhaust passage and may be driven by exhaust gases. A wastegate (not shown) may be coupled across the exhaust turbine of the turbocharger. Specifically, the wastegate may be included in a bypass passage coupled between an inlet and outlet of the exhaust turbine. By adjusting a position of the wastegate, an amount of boost provided by the exhaust turbine may be controlled. Alternatively, compressor 114 may be any suitable intake-air compressor, such as a motor-driven supercharger compressor.

In the configuration illustrated in FIG. 2, compressor 114 draws fresh air from air cleaner 133 and flows compressed air through intercooler 143. The intercooler may also be termed a charge air cooler. As such, each of compressor 114 and intercooler 143 are positioned upstream of intake throttle 165. The intercooler 143 cools the compressed air, which then flows via intake throttle 165 to intake manifold 144, depending on the position of throttle plate 192 of intake throttle 165. A compressor inlet pressure sensor 160 is coupled immediately upstream of the compressor 114 for providing a signal regarding compressor inlet pressure (CIP) to controller 112.

One or more bypass passages may be coupled across compressor 114 to divert a portion of intake air compressed by compressor 114 back upstream of the compressor into the compressor inlet. The one or more bypass passages may comprise a bypass passage 186. Additionally or alternatively, the bypass passage 186 may include an aspirator 180, positioned as shown in FIG. 2. Aspirators, may provide low-cost vacuum generation when utilized in engine systems, and in some examples may be passive devices. As such, aspirator 180 may be an ejector, an eductor, a venturi, a jet pump, or similar passive device. Thus, in the description herein, aspirators may alternatively be referred to as ejectors, venturi pumps, jet pumps, and eductors.

As depicted in the example of FIG. 2, a first end 145 of passage 186 may be coupled to intake passage 142 downstream of air cleaner 133 and upstream of compressor 114. A second end 147 of passage 186 may be coupled to intake passage 142, downstream of compressor 114 and upstream of throttle plate 192. Aspirator 180 may be positioned within the bypass passage 186 between the first end 145 and the second end 147. In other words, the motive outlet of aspirator 180 may be coupled to intake passage 142 upstream of compressor 114 and upstream of CIP sensor 160 via bypass passage 186. Therefore, motive flow of compressed air from downstream of the compressor 114 mixed with other fluids that may be drawn into the aspirator via suction may be streamed into intake passage 142 at a location upstream of the compressor and downstream of air cleaner 133 (e.g., at first end 145).

Further, the motive inlet of aspirator 180 may fluidically communicate with intake passage 142 at a point that is downstream of compressor 114, downstream of intercooler 143, and upstream of intake throttle 165. In alternative embodiments, the motive inlet of aspirator 180 may be fluidically coupled to the intake passage 142 downstream of compressor 114 but upstream of intercooler 143.

An amount of air diverted through the bypass passage 186 may depend upon relative pressures within the engine system. Alternatively, as shown in the depicted embodiment, a shut-off valve 185 may be included in the bypass passage 186 between second end 147 and the aspirator 180. As shown, shut-off valve (SOV) 185 is positioned upstream (relative to the flow of compressed air in the compressor bypass passage) of ejector 180. To elaborate, SOV 185 is located in the compressor bypass passage 186 at a position that is upstream of the motive inlet of ejector 180. No additional components may be positioned between the ejector 180 and SOV 185. Herein, a position of shut-off valve 185 may regulate the amount of air flowing through the bypass passage 186. By controlling shut-off valve 185, and varying an amount of air diverted through the bypass passage, a boost pressure provided downstream of the compressor can be regulated. This enables boost control and also controls compressor surge. Further, when air is diverted through passage 186, vacuum may be generated at ejector 180 for a variety of purposes including drawing fuel vapors from a canister via a canister purge valve, applying vacuum to a vacuum consumption device such as a brake booster, or for storage in a vacuum reservoir. SOV 185 may be a binary on/off valve where the valve may be adjusted between a fully open position and a fully closed position. In other examples, the SOV 185 may be a continuously variable valve capable of assuming positions between fully-closed and fully-open. In the fully closed position, gasses do not flow through the SOV 185, and in a fully open position, gasses do flow through the SOV 185, where an amount of gasses flowing through the SOV 185 increases with increasing deflection of the SOV 185 away from the closed first position up to the open second position, for constant pressure differentials across the valve. Said another way, an opening formed between an edge of the SOV 185 an interior walls of passage 191 may increase with increasing deflection away from the closed first position towards the open second position.

Engine system 200 further includes fuel system 40 comprising fuel tank 126, fuel vapor canister 122, and other components which will be described further below, and fuel vapor recovery system 140 which comprises canister 122, and other components which will be described further below. In the description herein, the fuel vapor canister 122 may also be referred to as charcoal canister 122. Thus, the fuel vapor recovery system 140 may not include the fuel tank 126. Fuel tank 126 stores a volatile liquid fuel that may be delivered via fuel supply line 131 to fuel injector 166, where fuel injector 166 may regulate a fuel injection amount to combustion chambers 164 in engine 110. Thus, supply line 131, may coupled on one end to the fuel tank 126, and on the other end to fuel injector 166 for delivering liquid fuel thereto.

To avoid emission of fuel vapors from the fuel tank 126 into the atmosphere, the fuel tank 126 may be vented to the atmosphere through fuel vapor canister 122. Fuel vapor canister may also be referred to as an adsorbent canister, a fuel system canister, a charcoal canister, or simply, a canister, in the rest of this description. Fuel vapor canister 122 may have a significant capacity for storing hydrocarbon-, alcohol-, and/or ester-based fuels in an adsorbed state. The adsorbent canister may be filled with activated carbon granules and/or another high surface-area material, for example, to adsorb fuel vapors received from the fuel tank. Nevertheless, prolonged adsorption of fuel vapor will eventually reduce the capacity of the adsorbent canister for further storage and may result in bleed emissions. Therefore, the adsorbent canister may be periodically purged of adsorbed fuel vapors, as further described hereinafter. While a single fuel vapor canister 122 is shown in FIG. 2, it will be appreciated that any number of canisters may be coupled in engine system 200.

A vapor blocking valve (VBV) 124 (also termed, fuel tank isolation valve 124) may be optionally included in a conduit between fuel tank 126 and fuel vapor canister 122. In some embodiments, VBV 124 may be a solenoid valve, and operation of VBV 124 may be regulated by adjusting a driving signal (or pulse width) of the dedicated solenoid. During normal engine operation, VBV 124 may be kept closed to limit the amount of diurnal vapors directed to canister 122 from fuel tank 126. During refueling operations, and selected purging conditions, VBV 124 may be temporarily opened to direct fuel vapors from the fuel tank 126 to canister 122. By opening the fuel tank isolation valve (FTIV) 124 during conditions when the fuel tank pressure is higher than a threshold pressure (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 124 positioned in a passage between the fuel tank and canister, in alternate embodiments, the FTIV may be mounted on fuel tank 126.

The fuel tank 126 may comprise a baffle 190 which may extend between opposite ends of the fuel tank 126, dividing the fuel tank into a first compartment 176, and a second compartment 178. Said another way, an edge of baffle 190 may be in sealing contact with an interior surface of the tank 126, so that the flow of fuel between the first compartment 176 and the second compartment 178 may be regulated by position of one or more vanes 194. As will be explained in greater detail below with reference to FIGS. 3-5, the baffle 190 may in some examples comprise one vane 194. However, in other examples, the baffle 190 may comprise more than one vane 194. The vanes 194 are pivotable, and may therefore be adjusted between an open first position and a closed second position, where an opening in the baffle providing fluidic communication between the first compartment 176 and the second compartment 178 increases with increasing deflection of the vanes 194 towards the open first position away from the closed second position. As such, the flow of fuel between the first compartment 176 and second compartment 178 may be regulated by adjusting the position of the vanes 194.

In some examples, the vanes 194 may be free to rotate on an axis parallel to the baffle 190. The vanes 194 may be held in the closed second position by a restoring force, which in the description herein may also be referred to as a restraining force, unless acted upon by a greater force which opposes the restoring force. In some examples, the restoring force may be gravity. Thus, the axis of rotation of the vanes 194 is not parallel to the force of gravity. In some examples, the axis of rotation of the vanes 194 may be approximately perpendicular to the force of gravity. In this way, the vanes 194 may be biased to the closed second position by their weight. Said another way, the weight of the vanes 194, may provide the restoring force which adjusts the position of the vanes 194 to the closed second position. However, during refueling, the pressure force acting on the vanes 194 from the flow of fuel into the fuel tank 126 may exceed the force of gravity, and therefore may deflect the vanes 194 away from the closed second position towards the open first position. Thus, in some examples, each of the vanes 194, may exert a restraining force to move toward the closed second position. Thus, in examples, where the vanes 194 are free to rotate, the restraining force may be based on the weight of the vanes 194. As such, the retraining force may be less than a threshold pressure force, where the threshold pressure force may represent a pressure force in first compartment 176, which would cause nozzle 170 to shut off while fueling fuel tank 126.

In other examples, the restoring force may be provided by a vane actuator 193. Thus, a vane actuator 193 may be physically coupled to at least one of the vanes 194, for adjusting the position of the vanes 194. Thus, in the description of vane actuators herein, when a vane actuator 193 is described as being physically coupled to a vane 194, the actuator 193 is capable of adjusting the position of the vane 194 between the open first position and the closed second position. In some examples, the engine system 200 may comprise only one actuator 193. The vane actuator 193 may be physically coupled to one vane 194. However in other examples, the vane actuator 193 may be physically coupled to more than one vane 194, and in some examples may be physically coupled to all of the vanes 194.

In other embodiments the engine system 200 may comprise more than one vane actuator 193. In such examples, each vane actuator 193 may be physically coupled to exactly one vane 194. However, in other examples, each vane actuator 193 may be physically coupled to more than one vane 194. In such examples, the vane actuator 193 may be passive and/or mechanical, such as a spring. As such, the position of the vanes 194 may be passively controlled. Thus, in examples where the actuator 193 is a spring, the spring may provide the restoring force for the vane 194. However, in other examples, the vane actuator 193 may be an actively controlled actuator (e.g., motor, electromagnetic actuator, etc.). In such examples, the vane actuator 193 may be in electrical communication with the controller 112. As such, the controller 112 may send signals to the vane actuator 193, for adjusting a position of one or more of the vanes 194. An example routine for adjusting the position of the vanes 194 based on vehicle operating conditions is described below with reference to FIG. 8.

However, in all examples, the restraining force may maintain the vanes 194 in the closed second position except during a refueling event. Thus, the restraining force may maintain the vanes 194 in the closed second position while the vehicle 100 is in motion. In further examples, the restraining force may maintain the vanes 194 in the closed second position during acceleration of the vehicle 100, such as during cornering, braking, etc.

It is important to note that in examples where more than one vane actuator 193 is included in engine system 200, more than one type of vane actuator 193 may be included. Thus, the position of one of the vanes 194 may be controlled by a spring, while the position of another vane 194 may be adjusted by an electromagnetic actuator. However, in other examples, only one type of vane actuator 193 may be included. Thus, in some examples, only one or more springs, or only one or more electromagnetic actuators, may be physically coupled to the vanes 194 for adjusting the positions thereof.

One or more pressure sensors 128 may be coupled to fuel tank 126 for estimating a fuel tank pressure or vacuum level. While the depicted example shows a pressure sensor coupled to fuel tank 126, in alternate embodiments, pressure sensor 128 may be coupled between the fuel tank and VBV 124. The fuel tank 126 may additionally comprise a fuel level sensor 173, where outputs from the sensor 173 may be sent to the controller 112 for estimating an amount of fuel in the fuel tank 126. Further, outputs from pressure sensor 128 and/or fuel level sensor 173 may be used to determine if a refueling event is occurring and/or if a refueling event has occurred. During a refueling event, fuel may be added to the fuel tank 126 by fuel dispensing nozzle 170. Specifically, fuel dispensing nozzle 170 may be inserted into a filler tube (e.g., filler tube 310 shown in FIG. 3) for flowing fuel into the fuel tank 126. Thus, a refueling event may comprise conditions where the engine 110 is off, and fuel is being added to the fuel tank 126. Controller 112 may determine if a refueling event is occurring and/or has occurred based on changes in the fuel level as estimated based on outputs from the fuel level sensor 173 and/or pressure changes in the fuel tank 126 as estimated based on outputs from the sensor 128. During a refueling event, the vanes 194 may be adjusted away from the closed second position towards the open first position as described in the example method of FIG. 8. Otherwise the vanes 194 may be adjusted to the open first position.

Fuel vapors in fuel tank 126, may be released to the fuel vapor recovery system 140, which may comprise charcoal canister 122. Specifically, fuel vapors in fuel tank 126, may be routed to the canister 122 for storage. During a purging operation, fuel vapors stored in canister 122 may be directed into intake manifold 144 via purge conduit 119. The flow of vapors along purge conduit 119 may be regulated by canister purge valve 164, coupled between the fuel system canister 122 and the engine intake manifold 144. The quantity and rate of vapors released by the canister purge valve may be determined by the duty cycle of an associated canister purge valve solenoid (not depicted). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake.

An optional canister check valve 152 may be included in purge conduit 119 to prevent intake manifold pressure from flowing gases in the opposite direction of the purge flow. However, in other examples, the engine system 200 may not include check valve 152. An estimate of the manifold airflow (MAF) may be obtained from a MAF sensor (not shown) coupled to intake manifold 144, and communicated with controller 112. Alternatively, MAF may be inferred from alternate engine operating conditions, such as mass air pressure (MAP), as measured by a MAP sensor 162 coupled to the intake manifold.

In the configuration shown in FIG. 2, canister purge valve 164 is a two-port canister-purge valve (CPV) that controls the purging of fuel vapors from the canister into the intake manifold, along each of the purge conduit 119 and purge bypass conduit 123. Purge conduit 119 fluidically couples CPV 164 to intake manifold 144. Purge bypass conduit 123 fluidically couples CPV 164 to aspirator 180 and thereon, to intake passage 142 upstream of compressor 114. Purge bypass conduit 123 is fluidically coupled to an entraining inlet 194 of ejector 180 via second check valve 150. Entraining inlet 194 of ejector 180 may also be termed suction port 194 of ejector 180. Thus, purge bypass conduit 123 may be coupled on one end to conduit 119 downstream of CPV 164, and on the other end to ejector 180, for flowing purge gasses from CPV 164 to intake passage 142 via aspirator 180.

However in other examples, the purge bypass conduit 123 may be coupled directly to the CPV 164. As such, the CPV 164 may be a three-port CPV, where an inlet of the CPV 164 may be fluidically coupled to the canister 122, and where a first outlet may be coupled via conduit 119 to the intake manifold 144, and where a second outlet may be coupled to the aspirator 180 via purge bypass conduit 123.

CPV 164, which is depicted schematically in FIG. 2, comprises a solenoid valve 172 and a flow restriction 174. In the depicted example, flow restriction 174 may be a sonic choke 174. It will be noted that the solenoid valve 172 and the sonic choke 174 may be positioned within a single, common housing of CPV 164. In other words, solenoid valve 172 and sonic choke 174 may be located within the same housing of the CPV 164. It will also be noted that sonic choke 174 is positioned proximate to solenoid valve 172 within CPV 164. It may be further noted that the CPV may include valves other than solenoid valves and flow restrictions other than sonic chokes without departing from the scope of the present disclosure. Sonic choke 174 may also be termed sonic nozzle 174. The sonic choke 174 may enable a more accurate metering of flow rate. Further, fuel injection via fuel injectors may be adjusted more accurately if purged fuel vapors enter the intake manifold at a steady flow rate allowing enhanced control of air-fuel ratio, emissions, and engine performance.

Opening or closing of CPV 164 is performed via actuation of solenoid valve 172 by controller 112. Specifically, a pulse width modulated (PWM) signal may be communicated to the solenoid valve 172 in CPV 164 during a canister purging operation. In one example, the PWM signal may be at a frequency of 10 Hz. In another example, the solenoid valve 172 may receive a PWM signal of 20 Hz.

When CPV 164 is open, depending on relative pressure levels within the engine system, purge flow may flow through the CPV 164 and then continue either into the entraining inlet 194 of ejector 180 via second purge bypass conduit 123, if SOV 185 is not closed, or into the intake manifold 144 via purge conduit 119. During certain conditions, purge flow may occur along both purge paths (e.g., purge conduit 119 and second purge bypass conduit 123) simultaneously.

A second check valve 150 may be positioned in second purge bypass conduit 123 downstream of CPV 164. Purged vapors may, therefore, flow only in the direction from CPV 164 towards entraining inlet 194 of ejector 180 and not in the opposite direction. Second check valve 150 effectually obstructs fluid flow from aspirator 180 into CPV 164.

Thus, during engine operating conditions, where the SOV 185 is not in a closed position, gasses from the canister 122 may flow through the CPV 164 to one or more of the aspirator 180 via purge bypass conduit 123 and intake manifold 144.

Fuel system 40 may be operated by controller 112 in a plurality of modes by selective adjustment of the various valves and solenoids. For example, the fuel system may be operated in a fuel vapor storage mode wherein the controller 112 may close CPV 164 and open canister vent valve 120 and FTIV 124 to direct refueling and diurnal vapors from canister 122 while preventing refueling fuel vapors from being directed into the intake manifold. In this mode, air stripped of fuel vapors may be streamed from canister 122 to the atmosphere through canister vent valve 120 and vent 117.

As another example, the fuel system may be operated in a refueling mode (e.g., when fuel tank refueling is requested by a vehicle operator), wherein the controller 112 may adjust the valves to depressurize the fuel tank before enabling fuel to be added therein. Therein the controller 112 may close canister vent valve (CVV) 120 and open each of CPV 164 and FTIV 124 to direct excess fuel tank pressure/vacuum into the intake manifold 144 via the canister 122.

As yet another example, the fuel system may be operated in a canister purging mode (e.g., when canister is saturated, an emission control device has attained light-off temperature, and with the engine running), wherein the controller 112 may open CPV 164, CVV 120, and close FTIV 124. By closing the FTIV, the canister can be purged more efficiently. During this mode, vacuum generated either by the intake manifold 144 or by the aspirator 180 may be used to draw fresh air through vent 117 and through fuel system canister 122 to purge the stored fuel vapors into intake manifold 144. In this mode, the purged fuel vapors from the canister, along with air drawn from the atmosphere to enable purging, are combusted in the engine. The purging may be continued until the stored fuel vapors amount in the canister is below a threshold.

In one example, one or more sensors 138 may be coupled to the canister 122 to provide an estimate of a canister load (that is, an amount of fuel vapors stored in the canister). As an example, sensor 138 may be a pressure sensor providing an estimate of canister pressure or canister load. In another example, the fuel system canister load may be based on the number and duration of refueling events that have occurred following a previous canister purging event. While sensor 138 is shown directly coupled to the canister in FIG. 2, other embodiments may position sensor 138 downstream of the canister, or in other locations, without departing from the scope of the present disclosure.

It will also be appreciated that vacuum generated by aspirator 180 may be used for additional purposes other than drawing purge flow, without departing from the scope of this disclosure. For example, aspirator generated vacuum may be stored in a vacuum reservoir. In another example, vacuum from the aspirator may be used in a brake booster.

Controller 112 may be configured as a microcomputer including a microprocessor unit, input/output ports, an electronic storage medium for executable programs and calibration values, random access memory, keep alive memory, and a data bus. Controller 112 may receive various signals from sensors 116 coupled to engine 110 such as fuel level sensor 173, pressure sensor 128, BP sensor 196, MAP sensor 162, CIP sensor 160, TIP sensor 161, etc. Furthermore, controller 112 may monitor and adjust the position of various actuators 118 based on input received from the various sensors 116. These actuators may include, for example, vane actuator 193, intake throttle 165, solenoid valve 172 of CPV 164, canister vent valve 120, FTIV 124, and shut-off valve 185. Storage medium read-only memory in controller 112 can be programmed with computer readable data representing instructions executable by a processor for performing the routines described below, as well as other variants that are anticipated but not specifically listed. Example routines are described herein with reference to FIGS. 3 and 4.

Turning now to FIG. 3, it shows an exterior side perspective view of an embodiment 300 of the fuel tank 126 shown in FIGS. 1-2. In the description herein, axis system 330 may be used to describe the relative positioning of components of the fuel tank 126. The axis system 330 may comprise a vertical axis 336, a horizontal axis 334, and a lateral axis 334. A top wall 326 and bottom wall 324 may define the vertical extent of the fuel tank 126 along the vertical axis 336. Thus, the top wall 326 may be referred to as the "top" of the fuel tank 126, where the top of the fuel tank 126 may be the top of the fuel tank 126 relative to the ground, when fuel tank 126 is coupled to a vehicle system (e.g., vehicle system 100 shown in FIG. 1). Similarly the bottom wall 324 may be referred to as the "bottom" of the fuel tank 126, where the bottom of the fuel tank 126, may be the bottom of the fuel tank 126 relative to the ground, when fuel tank 126 is coupled to a vehicle system.

A front side wall 322, and a back side wall 328 may physically couple bottom wall 324 and top wall 326. Further, two end walls 320, may be positioned, one at either end, of the fuel tank 126. Thus, the end walls 320 may extend along the lateral axis 334. In some examples, as shown in FIG. 3, the end walls 320 may be flat, and walls 322, 324, 326, and 328, may be curved. As such, the fuel tank may be approximately cylindrical. However, it should be appreciated that in other examples, the shape and size of the fuel tank 126, and the shape, size, and configuration, of the walls 320, 322, 324, 326, and 328 may be different than as depicted in FIG. 3. As such, in some examples walls 322, 324, 326, and 328 may be flat. In some examples, the end walls 320, may be circular, oval, triangular, rectangular, or other geometric shape. Further, the end walls 320 in some examples may not be flat, but may instead by curved. The fuel tank 126 may therefore take on any prismatic shape. Each of walls 320, 322, 324, 326, and 328 may be shaped as any geometric shape, or non-geometric shape.

The walls of the fuel tank may be comprised of any suitable material such as plastic, metal, metal alloy, etc. Further, the walls 320, 322, 324, 326, and 328 of the fuel tank 126 may be thin, so that they define a hollow interior reservoir of the fuel tank 126 for storing liquid fuel. In some examples, the walls 320, 322, 324, 326, and 328 may be 1 mm thick. However, in other examples, the walls 320, 322, 324, 326, and 328 may be thicker than 1 mm. In still further examples, the thickness of the walls 320, 322, 324, 326, and 328 may be less than 1 mm. The walls 320, 322, 324, 326, and 328 may be in sealing contact, so that interior and exterior portions of the fuel tank 126 are sealed off from one another and may not be in fluidic communication with one another except for through one or more of a filler tube 310, supply line 131, and return line 321. Said another way, fuel may only enter and/or exit the fuel tank 126 through one or more of the filler tube 310, supply line 131, and return line 321.

As described above with reference to FIGS. 1-2, fuel tank 126 may be configured for receiving and storing fuel to be used in combustion of an engine (e.g., engine 110 shown in FIGS. 1-2). Fuel may be dispensed into the fuel tank 126 from a fuel source, such as nozzle 170. A filler tube 310 may be configured for receiving the nozzle 170, and directing fuel from the nozzle into the fuel tank 126. Thus, the filler tube 310, may comprise a first portion 312 which extends exterior to the fuel tank 126, away from an end wall 320, and a second portion 314 (shown in dashed lines) which extends into the interior of the fuel tank 126 from an end wall 320. In this way, the filler tube 310 may extend into the interior of the fuel tank 126, for delivering fuel thereto. Said another way, the filler tube 310 may be partially positioned within the fuel tank 126, so that a portion of the filler tube 310 is positioned within the fuel tank 126, and another portion of the filler tube 310 is positioned exterior to the fuel tank 126. Thus, upon insertion of the nozzle 170 into the filler tube 310, fuel may flow from the nozzle 170, into the filler tube 310, and into the interior of the fuel tank 126. Further, the filler tube 310 may be positioned more proximate the bottom of the fuel tank 126 than the top. When coupled in a vehicle system therefore, the filler tube 310 may in some examples be coupled to the fuel tank 126 more proximate the bottom of the fuel tank 126 with respect to the ground than the top of the fuel tank 126.

In some examples, a filler cap 318 may be included in a distal end of the filler tube 310. Thus, the filler cap 318 may be positioned on an end of the first portion 312, furthest away from the fuel tank 126. The cap 318, may be removed before the nozzle 170 may be inserted. Further, the cap 318 may seal the fuel tank 126 when fastened to the end of the filler tube 310. In further examples, the filler tube 310 may include a position sensor 316. Outputs from the position sensor 316 may be used to estimate and/or measure a position of the nozzle 170. Thus, a controller (e.g., controller 112 shown in FIGS. 1-2) may determine that a nozzle (e.g., nozzle 170) has been inserted into the filler tube 310 based on outputs from the position sensor 316.

The fuel tank 126 may also comprise fuel supply line 131 described above with reference to FIG. 2, and a return line 321 for receiving fuel not combusted in the engine. Fuel supply line 131 may in some examples be coupled to a pump (e.g., pump 412 shown in FIG. 4) for providing pressurized fuel to the engine. Thus, fuel supply line 131 may provide fluidic communication between the fuel tank 126 and the engine, for supplying fuel stored in the fuel tank 126 to the engine.

As described above with reference to FIG. 2, an actuator 193 may be physically coupled to the fuel tank 126. In some examples, the actuator 193 may be coupled to the fuel tank 126 via a rotatable rod 304. Specifically, the actuator 193 may be physically coupled to one or more vanes (e.g., vanes 194 shown in FIG. 2), for adjusting the position of the vanes. In the example shown in FIG. 3, the actuator 193 may be positioned external to the fuel tank 126. However, in other examples, as shown in FIGS. 5A-5B, the actuator 193 may be positioned internally within the fuel tank 126. As described above with reference to FIG. 2, more than one actuator may be coupled to the fuel tank 126 and/or may be positioned within the fuel tank 126. Further, the actuator 193, may be a passively, or actively controlled device. In examples where the actuator 193 is a passively controlled device, the actuator 193 may be a spring, magnet, etc. In examples where the actuator 193 is actively controlled, the actuator 193 may be a motor, electromagnetic actuator (e.g., solenoid), etc.

Moving on to FIG. 4, it shows an embodiment 400 of an interior side perspective view of the fuel tank 126. Thus, FIG. 4 shows the fuel tank 126 as depicted in FIG. 3, with the walls 320, 322, 324, 326, and 328 illustrated as transparent, exposing the interior of the fuel tank 126. Components that may be contained within the walls of the fuel tank 126, and therefore included interior to the fuel tank 126 are shown with solid lines. Other components that may be exterior to the fuel tank 126 are shown in dashed lines. It is important to note that fuel tank 126 is substantially hollow, so that the interior of the fuel tank 126, may be filled with gasses and/or liquid.

Baffle 190, described above with reference to FIG. 2 may include one or more adjustable vanes 194 for regulating the flow of fuel within the fuel tank 126. The baffle 190 may be made of plastic, metal, metal alloy, or any other suitable material. Further, the baffle may extend along the vertical and lateral axis of the fuel tank 126, so that an edge 414 of the baffle may be in sealing contact with an interior surface of walls 322, 324, 326, and 328. Said another way, the baffle 190 may extend fully, and may be approximately the same surface area, as a cross-section of the fuel tank 126, taken along cutting plane 420. As such, no additional components including air may separate the edge 414 of the baffle 190 from the walls 322, 324, 326, and 328. Therefore, the baffle 190 may divide the fuel tank 126 into two regions, first compartment 176, and second compartment 178. Regions 176 and 178 may be hollow, and therefore may store liquid fuel. As such, fuel may not flow around the baffle between the first compartment 176 and second compartment 178. Said another way, fuel may only flow between the first compartment 176 and second compartment 178 through the baffle 190. In such examples, baffle 190, specifically edge 414, may be physically coupled to interior surfaces of walls 322, 324, 326, and 328 using any suitable joining and/or fastening method such as welding, ultrasonic welding, injection molding, etc. However, in other examples, the baffle 190 may not extend between the walls 322, 324, 326, and 328, and as such, air and/or additional components may separate the baffle 190 from walls of the fuel tank 126 such that fuel may flow around the baffle 190 between the first compartment 176 and second compartment 178.

As shown in the examples of FIG. 3, the baffle 190 may be planar, and may have a surface area approximately equal to that of the end walls 320. Said another way, the baffle 190, may form a cross section of the fuel tank 126, where the cross-section is taken along the lateral axis 332 in the example of FIG. 4. However, in other examples, the baffle 190 may not be flat, and may take on other non-planar shapes, such as curved, wavy, undulating, etc.

Further, in other examples, the baffle 190 may not extend across a cross-sectional area of the fuel tank 126 taken along cutting plane 420, but instead may extend across a cross-sectional area of the fuel tank 126 defined along cutting plane 425. In such examples, the baffle 190 may extend along the vertical and horizontal axis of the fuel tank 126, so that the edge 414 of the baffle 190 may be in sealing contact with an interior surface of walls 320, 324, and 326. As such, the baffle 190 may extend along the extent of the fuel tank 126 in both the vertical axis 336, and horizontal axis 334. In such examples, baffle 190, specifically edge 414, may be physically coupled directly to interior surfaces of walls 320, 324, and 326 using any suitable joining and/or fastening method such as welding, ultrasonic welding, injection molding, etc.

In still further examples, the baffle 190 may not extend across a cross-sectional area of the fuel tank 126 taken along cutting plane 420, but instead may extend across a cross-sectional area of the fuel tank 126 defined along the cutting plane 430. In such examples, the baffle 190 may extend along the lateral and horizontal axis, 332 and 334 respectively, of the fuel tank 126, so that the edge 414 of the baffle 190 may be in sealing contact with an interior surface of walls 320, 322, and 328. As such, the baffle 190 may extend along the extent of the fuel tank 126 in both the lateral axis 332, and horizontal axis 334. In such examples, baffle 190, specifically edge 414, may be physically coupled directly to interior surfaces of walls 320, 322, and 328 using any suitable joining and/or fastening method such as welding, ultrasonic welding, injection molding, etc.

Baffle 190 may comprise one or more vanes 194. In some examples, the baffle 190 may comprise one vane. However, in other examples, the baffle 190 may comprise more than one vane. In some examples, the vanes 194 may comprise approximately four vanes. As will be described in greater detail below with reference to FIGS. 5A-5B, the vanes may include a plurality of apertures for providing fluidic communication between the first compartment 176 and the second compartment 178. Further, the vanes may be adjustable between the open first position and closed second positions. When in the closed second position, the only fluidic communication provided between the first compartment 176 and second compartment 178 may be through the apertures, if included, in the vanes 194. However, when in the open first position, fluidic communication between the first compartment 176 and second compartment 178 is provided so that fuel may flow therebetween.

The vanes 194 may remain in the closed second position, unless a nozzle (e.g., nozzle 170 shown in FIGS. 1-2), is inserted in the filler tube 310. Upon insertion of the nozzle into the filler tube 310, and/or receiving of the nozzle 170 into the filler tube 310, the vanes 194 may be enabled to open as described in greater detail below with reference to FIG. 8. In some examples, where the actuator 193 is a passive device such as a spring, magnet, etc., the vanes 194 may be enabled to open via a mechanical release of said vanes 194. In other examples, where the actuator 193 is an actively controlled device such as an electromagnetic actuator, the vanes 194, may be enabled to open via an electromechanical release of said vanes 194. Further, in examples, where the actuator 193 is an actively controlled device, the actuator may open the vanes 194 in response to signals received from a controller (e.g., controller 112 shown in FIGS. 1-2), where the controller may send signals to the actuator 193 for opening the vanes 194 in response to input received from various sensor (e.g., fuel level sensor 173). Thus, as described in greater detail below with reference to FIG. 8, in response to determining that the nozzle has been inserted into the filler tube 310, the controller may send signals to the actuator 193 for adjusting the position of the vanes 194 away from the closed second position towards the open first position. In still further examples, where the vanes 194 may not be coupled to an actuator, and are free to rotate passively, the vanes 194 may be enabled to open by a pressure exerted on said vanes 194 from fuel entering the fuel tank 126 during refueling. Thus, the pressure force of fuel acting against the vanes 194 during refueling, may in some examples overcome a weight of said vanes 194, and therefore move the vanes 194 away from the closed second position towards the open first position.

In another embodiment, the position of the vanes 194 may be adjusted based on an electrical relay from a sensor output. For example, a sensor such as sensor 316 shown above in FIG. 3, may send one or more outputs upon insertion of a nozzle (e.g., nozzle 170 shown in FIGS. 1-3). The sensor output may be amplified by a driver, where the driver may drive an electronic relay to open the vanes 194. Thus, upon detection of insertion of the nozzle into filler tube 310, outputs from the sensor may be coupled to a relay or electromechanical device such as actuator 193 through a driver, to open the vanes 194.

In some examples, the fuel tank 126 may additionally include one or more auxiliary baffles 403. As shown in the example of FIG. 4, the auxiliary baffles 403 may include only one baffle. Thus, in some examples, the fuel tank 126 may comprise exactly two baffles. However, in other examples, the auxiliary baffles 403 may comprise more than one baffle. In such examples, the fuel tank 126 may comprise exactly three baffles. In still further examples, the fuel tank 126 may comprise four or more baffles. The auxiliary baffles 403 may be positioned within the fuel tank 126 parallel to the baffle 190. Further, the auxiliary baffles 403 may be sized, such that they are approximately the same size as the baffle 190. In this way, the auxiliary baffles 403 may be in sealing contact with interior surface of the walls 322, 324, 326, and 328 when the baffle 190 is orientated within the fuel tank 126 as shown in FIG. 4. Therefore, the auxiliary baffles 403 may divide the fuel tank into more regions than just the first compartment 176 and second compartment 178. The number of regions included in the fuel tank 126 in addition to the first compartment 176 and second compartment 178, may be the same as the number of auxiliary baffles 403. Thus, in the example of FIG. 4, where only one auxiliary baffle 403 is included in the fuel tank, one auxiliary region 407 may be included in the fuel tank 126, on the opposite side of the auxiliary baffle 403 as the second compartment 178.

In some examples, the auxiliary baffles 403 may comprise a plurality of apertures 405 for providing fluidic communication between regions of the tank adjacent the auxiliary baffle 403. Said another way, fuel may flow through the apertures 405, when included, in the one or more auxiliary baffles 403. However, in other examples, the auxiliary baffle 403 may not include apertures 405. In examples where two or more auxiliary baffles 403 are included in the fuel tank 126, any combination or order of the auxiliary baffles 403 may include apertures 405.

In still further examples, the auxiliary baffles 403 may not be in sealing contact with at least four walls of the fuel tank 126, and as such fuel may flow around the one or more auxiliary baffles 403, between different regions of the fuel tank 126 divided by the auxiliary baffles 403.

Auxiliary baffles 403 may in some examples, additionally include vanes 194 in a similar manner as described above for baffle 190. Thus, the vanes 194 may be included one or more auxiliary baffles 403 and the position of the vanes 194 may be controlled either passively or actively. Specifically a position of the vanes 194 may be adjusted by one or more of a spring, magnet, motor, electromagnetic actuator, solenoid, etc. In still further examples, the vanes 194 may not be coupled to an actuator 193, and the position of the vanes 194 may be adjusted by the weight and orientation of the vanes, and any other forces acting on the vanes 194 in the fuel tank 126, such as pressure forces. It is important to note that when two or more auxiliary baffles 403 are included in the fuel tank 126, not all of the auxiliary baffles 403 may comprise vanes 194. Thus, one of the auxiliary baffles 403 may include vanes 194, and another one of the auxiliary baffles 403 may not.

However, in all examples, where the fuel tank 126 includes auxiliary baffles 403, the auxiliary baffles 403 are not positioned between the baffle 190 and the filler tube 310. Thus, no additional baffles separate the baffle 190 comprising the vanes 194, from the filler tube 310. As such, fuel entering the fuel tank 126 from filler tube 310, exits filler tube 310, flows into the fuel tank 126, and may flow against the baffle 190 and/or vanes 194 of the baffle 190. Further, the fuel may flow against baffle 190 before contacting any other baffle. Thus, fuel entering the fuel tank 126 during refueling may not flow past any auxiliary baffles 403 before passing through the baffle 190.

Fuel tank 126 may additionally comprise a pump 412, for pumping fuel in the fuel tank 126 to an engine (e.g., engine 110 shown in FIGS. 1-2). Pump 412 may be fluidically coupled to supply line 131, where supply line 131 may be fluidically coupled on its other end to the engine for transferring fuel from the fuel tank 126 to the engine. Thus, fuel may be pumped from the fuel tank 126, through the fuel pump 412, into supply line 131, to the engine. Additionally fuel level sensor 173 is shown in FIG. 4, for estimating and/or measuring a level of fuel in the fuel tank 126.

As explained above with reference to FIG. 3, in some examples, when included, actuator 193 may be exterior to the fuel tank 126. However, in other examples, the actuator may be included within the fuel tank 126, but exterior to the baffle 190. In still further examples, as shown below with reference to FIGS. 5A-5B, the actuator may be included within the baffle 190.

In this way, a system may comprise: a filler pipe partially positioned in a tank to receive fuel from an external filler nozzle, a first baffle which may form a first compartment in said tank into which said filler pipe may be positioned, where said first baffle may include a plurality of pivotable vanes, where each vane may exert a restraining force to move toward a closed position, where said restraining force may be less than a minimum force from fuel pressure in said first compartment which when applied against said filler pipe may cause said filler nozzle to shut off while fueling said tank, where said first baffle may further include a plurality of holes, and a second stationary baffle which may not include movable vanes which may positioned in said tank to form a second compartment between said first and second baffles and a third compartment between a side of said second baffle opposite said second compartment and a wall of said tank, where said second baffle may include a plurality of holes therein to allow fuel to flow between said second and third compartments. In some examples, the restraining force may be based on a weight of said vanes. In other examples, the restraining force may further be based on a return spring coupled to said vanes. In yet further examples, the restraining force may be based on an electromechanical device which is activated in response to insertion of said nozzle into said filler pipe. The restraining force may keep said vanes in said closed position while a vehicle driven by an internal combustion engine is in motion which may include rapid cornering of said vehicle. Further, the filler pipe may be open toward a bottom of said tank. In some examples, the system may further comprise a fuel system to supply fuel from said tank to an internal combustion engine and a charcoal canister having an inlet coupled to said tank to store a portion of fuel vapors generated in said tank. Said charcoal canister may also having an outlet coupled to said internal combustion engine.

Turning now to FIGS. 5A-5B, they show side perspective views of the baffle 190 included in the fuel tank 126 shown above with reference to FIGS. 1-4. As such, FIGS. 5A and 5B may be discussed together in the description herein. FIG. 5A, shows an embodiment 500 where the vanes 194 of baffle 190 may be in the open first position, while FIG. 5B shows an embodiment 550 where the vanes 194 may be in the closed second position. The position of the vanes 194 may be adjusted to regulate the flow of fuel through the baffle 190. Specifically the position of the vanes 194 may be adjusted by an actuator (e.g., actuator 193 shown in FIGS. 2-4). In some examples, the actuator may be a passively controlled actuator such as spring 504. As shown in FIG. 5B, the spring 504 may provide a restoring force to one or more of the vanes 194, so that the vanes 194 are biased towards the closed second position. Said another way, the spring 504 may be coupled to one or more of the vanes 194 such that the spring 504 is more compressed with the vanes 194 in the open first position than when in the closed second position. Due to the compression of the spring 504 with increasing deflection of the vanes 194 away from the closed first position, the spring 504 provides a restoring force on the vanes 194, which bias the vanes towards the closed second position. The spring 504 may be compressed upon insertion of a nozzle (e.g., nozzle 170 shown in FIGS. 1-2) into a filler tube (e.g., filler tube 310 shown in FIGS. 3-4). In some examples, the nozzle may provide the compressive force on the spring, which compresses the spring, and thereby moves the vanes 194 towards the open first position away from the closed second position.

In other examples, the actuator may be an actively controlled actuator such as electromagnetic actuator 503. Electromagnetic actuator 503 may be in electrical communication with a controller (e.g., controller 112 shown in FIGS. 1-2). As such the controller may send signals to the electromagnetic actuator 503 for adjusting a position of the vanes 194. Specifically, upon determining that the nozzle has been inserted into the filler tube, the controller may send signals to the actuator 503 for adjusting the position of the vanes 194 to a more open position. Said another way, the upon determining that the nozzle has been inserted into the filler tube, the controller may send signals to the actuator 503 for adjusting the position of the vanes 194 towards the open first position, away from the closed second position.

Thus, each of the vanes 194 may be physically coupled to an actuator, such that actuator may adjust a position of the vanes 194. Specifically, the actuator may be physically coupled to one or more vanes 194 for rotating the vane between the open first position and the closed second position.

In still further examples, as shown in FIGS. 5A and 5B, one or more of the vanes 194 may not be physically coupled to an actuator. In such examples, the vanes 194 may still be pivotable, and may be rotated along axis X-X.' Thus, in examples where one or more of the vanes 194 is not coupled to an actuator, the vanes 194, may be free to move between the open first position and closed second position based on gravity, pressure, etc. In such examples, the baffle 190 and vanes 194 may be positioned so that the weight of said vanes 194 biases the vanes 194 towards the closed second position. Said another way, the weight of the vanes 194 may exert a restraining force which moves the vanes 194 towards the closed second position. The vanes 194 may be adjusted away from the closed second position towards the open first position, when a pressure force is exerted on said vanes 194 which exceeds the weight of said vanes 194. As such, the retraining force may be less than a threshold pressure force, where the threshold pressure force may be a pressure force inn a compartment on a refueling side of the baffle 190 (e.g., first compartment 176 shown in FIGS. 2 and 4), which when applied against a filler pipe (e.g., filler pipe 310 shown in FIGS. 3-4) would cause a filler nozzle (e.g., nozzle 170 shown in FIGS. 1-2) to shut off while fueling a fuel tank (e.g., fuel tank 126 shown in FIGS. 1-4).

As illustrated in the examples of FIGS. 5A and 5B, the vanes 194, may be rectangular, with the longer sides extending along axis X-X.' However, in other examples, the vanes 194 may comprise other geometric shapes, such as circles, triangles, ellipses, polyhedrons, etc. In some examples, the vanes 194 may extend along the length of the baffle 190 along axis X-X.' However, in other examples, the vanes 194 may not extend along the length of the baffle 190.

The vanes 194 may be pivotably adjustable. That is, the vanes 194, may be rotated around an axis X-X.' In some examples axis X-X' may be parallel with respect to the ground when baffle 190 is coupled to a vehicle system such as vehicle system 100 shown above with reference to FIG. 1. Thus, vanes 194 may be rotated such that in the open first position the vanes 194 may be approximately perpendicular to a first surface 510 of the baffle 190, and in the closed second position the vanes 194 may be approximately parallel to the first surface 510 of the baffle 190. As will be described in greater detail below with reference to FIGS. 6A-6B, each of the vanes 194 may be coupled at one end to a rotatable rod 304. The rotatable rod 304 may be coupled to an actuator. Therefore, in some examples, the rotatable rod 304 may be coupled to spring 504. In other examples, the rotatable rod 304 may be coupled to electromagnetic actuator 503. In still further examples, the rotatable rod 304 may be coupled to both spring 504 and electromagnetic actuator 503. Alternatively, rod 304 may not be coupled to spring 504 or actuator 503, and may rotate based on its weight, and other natural forces, such as pressure.

Thus rod 304 may be free to rotate around axis X-X.' In still further examples more than one rod 304, and therefore more than one of the vanes 194 may be coupled to the same actuator. In such examples, more than one rod 304, may be coupled to the electromagnetic actuator 503. In other examples, more than one rod 304 may be coupled to the spring 504. As such, each actuator such as each spring 504, and/or each electromagnetic actuator 503 may be coupled to more than one rod 304, and therefore to two or more of the vanes 194. As such the actuator 503, and/or spring 504, may in some examples adjust the position of two or more vanes 194.

In the example shown in FIG. 5A, the vanes 194 may be adjusted to the open first position. However, in other examples, only one of the vanes 194 may be adjusted to the open first position, while the other vanes 194 may remain in the closed second position. Thus, the position of each of the vanes 194 may be adjusted independently of one another. In such examples, each one of the vanes 194 may be coupled to separate actuators. However, in other examples, the position of all of the vanes 194 may be adjusted in unison.

As the position of the vanes 194 is adjusted away from the closed second position towards the open first position, one or more openings 506 may form between each of the vanes 194 and the first surface 510 of the baffle 190. The openings 506 may extend through the baffle 190, from the first surface 510 to a second surface 512. Thus, liquid and/or gasses may flow through the baffle 190 via the opening 504. As such, the size of the openings 506, and therefore the amount of liquid and/or gasses flowing through the baffle 190 may increase with increasing deflection of the vanes 194 towards the open first position away from the closed second position.

In the second closed position of the vanes 194, as shown in FIG. 5B, the vanes 194, may be approximately parallel to the first surface 510. Thus, in some examples, the vanes 194 may be approximately flush with the first surface 510 when in the closed second position. As such, liquid and/or gasses may not flow through openings 506 when the vanes 194 are in the closed second position. However, one or more of the vanes may comprise a plurality of apertures 502, which be sized and/or shaped to restrict the flow of liquids and/or fuel through the baffle 190. Although the apertures 502 are shown in FIG. 5B as circular, in other examples the apertures 502, may be shaped differently such as rectangular, square, triangular, etc. Further, the relative sizes of the apertures 502 may in some examples be uniform, and in other examples, may be variable. The apertures 502 may be distributed on the vanes 194 in a uniform pattern. In other examples the apertures 502 may be disturbed on the vanes 194 randomly. In still further examples, the apertures 502 may be distributed on the vanes 194 according to a mathematical distribution, such as Gaussian.

Thus, in some examples, where the apertures 502 are not included on the vanes 194, flow through the baffle 190, may be restricted so that no liquids and/or gasses may flow through the baffle 190 when all of the vanes 194 are in the closed second position. However, when the apertures 502 are included on the vanes 194, liquids and/or gasses may still flow, through the baffle 190, but in a restricted manner. Thus, the apertures 502, may be sized, shaped, and orientated on the vanes 194, to act as a flow restriction through the baffle 190, so that flow through the baffle 190 may not exceed a threshold. More detailed illustrations of the open first position and closed second position of the vanes 194 are shown below with reference to FIG. 6A-6B.

It is important to note that the structure and operation of the vanes 194 may be included in a similar manner as described above in baffle 190, for auxiliary baffles (e.g., auxiliary baffles 403 shown in FIG. 4). Thus, vanes 194 may not only be included in baffle 190, but may also be included in other fuel tank baffles as well.

Turning now to FIGS. 6A-6B, they show examples positions which the vanes 194 may be adjusted to. As such, FIGS. 6A and 6B may be discussed together in the description herein. FIG. 6A shows an embodiment 600 where the vanes 194 may be in the open first position and FIG. 6B shows an embodiment 650 where the vanes 194 may be in the closed second position.

As shown in both FIGS. 6A and 6B, the vanes 194 may be coupled to the rotatable rods 304, such that the vanes 194 may be rotated about the axis of rotation of the rods 304, as described above with reference to FIGS. 5A-5B. In some examples, the vanes 194 may be coupled to the rods 304 at a first end 604 of vanes 194. However, in other examples, as shown in the examples of FIGS. 6A-6B, a portion of the vanes 194 may extend through the rods 304. As such, the vanes 194 may be coupled to the rods 304 more proximate the first end 604 than a second end 602.

In the open first position as shown in FIG. 6A, the first end 604 of the vanes 194 may be more proximate the interior of baffle 190 than the second end 602. Thus, the second end 602 may extend outward from the baffle 190 in the open first position. In some examples, the vanes 194 may be approximately orthogonal to the baffle 190 when in the open first position. The openings 506 formed between the vanes 194 and the baffle 190 in the open first position, may allow for liquid and/or gasses to pass through the baffle 190. When in the open first position therefore, the vanes 194, may not be in sealing contact with one another, or with interior surface 610 of the baffle 190.

However, in the closed second position, the each of the vanes 194 may be in sealing contact with one or more other vanes 194, and/or interior surfaces 610 of the baffle 190. Thus, in the closed second position, openings 506 may not be formed in the baffle, and fluidic communication between opposite sides of the baffle 190 may be restricted. Specifically, the first end 604 a first one of the vanes 194 may be in sealing contact with an interior surface 610 of the baffle 190, while the second end 602 of that vane may be in sealing contact with the first end 604 of a second one of the vanes 194. Further, the second end 602 of a third one of the vanes 194 may be in sealing contact with the interior surface 610 of the baffle 190, while the first end 604 of that vane may be in sealing contact with the second end 602 of a fourth one of the vanes 194. Vanes 194 not in sealing contact with interior surface 610 in the closed second position, may be in sealing contact with other vanes 194 at both their first end 604 and second end 602. Specifically, the first end 604 of each of the vanes 194 not in sealing contact with interior surface 610 in the closed second position, may be in sealing contact with the second end 602 of an adjacent one of the vanes 194. An example method for regulating the flow of liquid and/or gasses through the baffle 190 by adjusting the position of the vanes 194 is shown below in FIG. 8.

Figure 7:
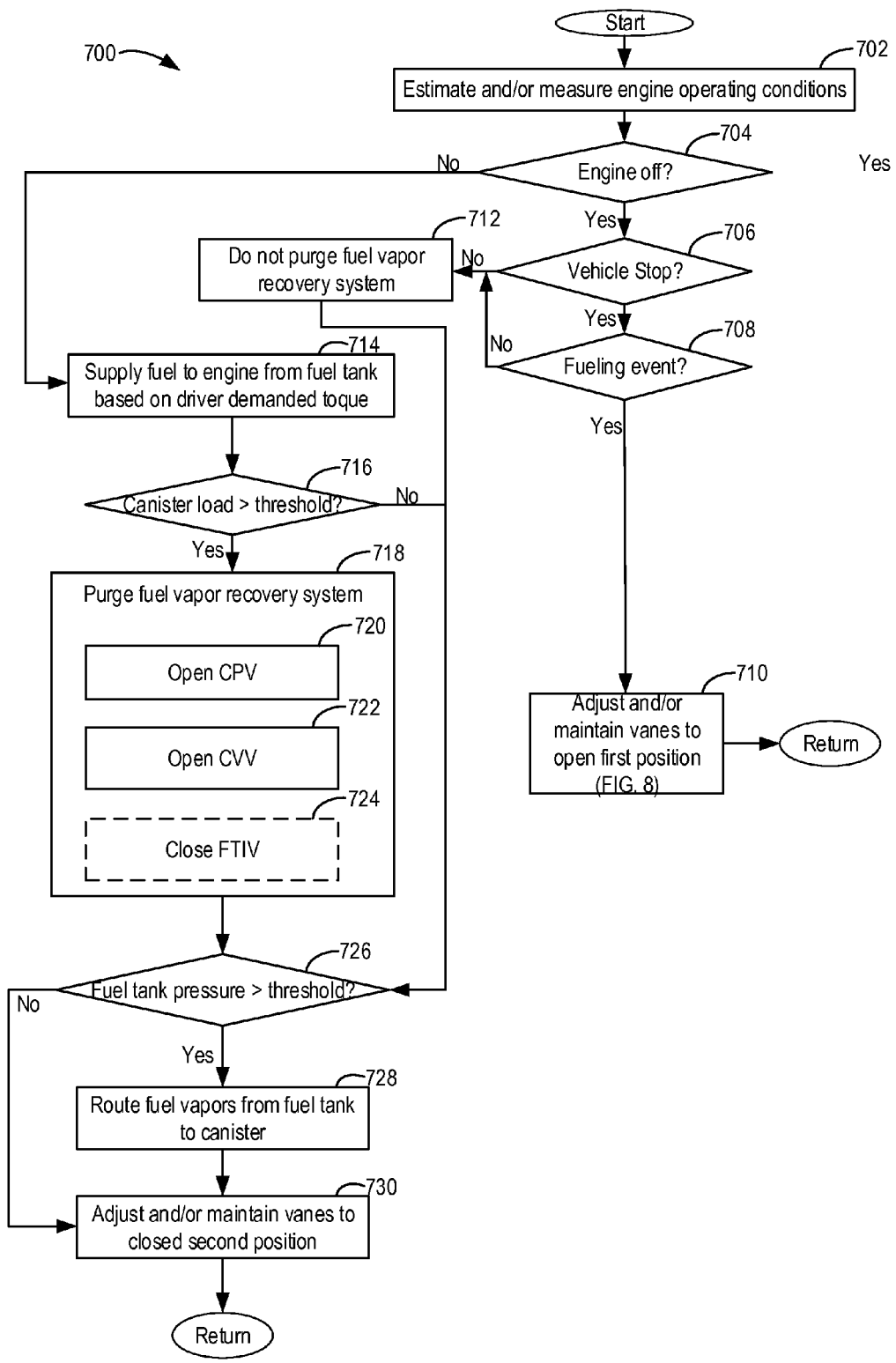
FIG. 7 shows a flow chart of a method for regulating a flow of fuel into and out of a fuel tank.

Turning now to FIG. 7, it shows an example method 700 for regulating the flow of fuel and/or fuel vapor into and out of a fuel tank (e.g., fuel tank 126 shown in FIGS. 1-4). When a vehicle system (e.g., vehicle system 100 shown in FIG. 1) comprising an engine (e.g., engine 110 shown in FIGS. 1-2) is not stationary, fuel may slosh around in the fuel tank. Thus, during conditions where the vehicle system is moving, method 700 may comprise adjusting pivotable vanes (e.g., vanes 194 shown in FIGS. 2, 4-6) of a baffle (e.g., baffle 190 shown in FIGS. 2, 4-6) to a closed second position so that the movement of fuel within the fuel tank may be reduced. However, during fueling events, where the fuel tank is being supplied with fuel, the vanes may be adjusted to an open first position as described in greater detail below with reference to FIG. 8. Additionally, fuel vapors in the fuel tank may be routed to a fuel vapor recovery system (e.g., fuel vapor recovery system 140 shown in FIG. 2), to reduce pressure in the fuel tank during fueling. During engine combustion, the fuel vapor recovery system may be purged of fuel vapors. Further, fuel from the fuel tank may be supplied to the engine.

Method 700 and all other methods described therein, such as method 800, may be executed by a controller (e.g., 112 shown in FIGS. 1-2). As such, the methods 700, and 800 may be stored in non-transitory memory on the controller, and may be executed based on signals received from various engine sensors (e.g., sensors 128, 173, and 138 shown in FIG. 2).

Method 700 begins at 702 which comprises estimating and/or measuring engine operating conditions. Engine operating conditions may include a fuel tank pressure as estimated based on outputs from a fuel tank pressure sensor (e.g., sensor 128 shown in FIG. 2), fuel level as estimated based on outputs from a fuel level sensor (e.g., fuel level sensor 173 shown in FIG. 2), a canister load as estimated based on outputs from a canister pressure sensor (e.g., sensor 138 shown in FIG. 2), a driver demanded torque as estimated based on input from a vehicle operator (e.g., vehicle operator 130 shown in FIGS. 1-2) via an input device (e.g., input device 132 shown in FIGS. 1-2), etc.

After estimating engine operating conditions at 702, method 700 may then proceed to 704, which comprises determining whether or not the engine is off. Determining if the engine is off may be based on a position of a throttle valve (e.g., throttle plate 192 shown in FIG. 2), fuel injection amount, MAP sensor (e.g., sensor 162 shown in FIG. 2), a vehicle key-off event, the driver demanded torque, etc. Thus, if it is determined that fuel is not being injected to the engine, and that the engine is off, then method 700 may continue to 706 which comprises determining if a vehicle stop conditions exists.

A vehicle stop condition may exists if a vehicle system (e.g., vehicle system 100 shown in FIG. 1) and in some cases if the engine are not moving. Determining if the vehicle system is stopped may be based on outputs from one or more sensors (e.g., a crankshaft sensor, wheel position sensor, etc.) used in determining the speed of the vehicle system. The vehicle may be stopped after a key-off event. However, in other examples the vehicle system may be stopped during idling.

If the vehicle is not moving, and it is determined at 706 that a vehicle stop condition exists, then method 700 may continue to 708 which comprises determining if a fueling event is occurring and/or is desired. A fueling event may comprise conditions where fuel is being added to the fuel tank. Thus a fueling event may comprise inserting and/or receiving a nozzle (e.g., nozzle 170 shown in FIG. 1-2) into the fuel tank, and subsequently dispensing fuel into the fuel tank via a filler tube (e.g., filler tube 310 shown in FIGS. 3-4) of the fuel tank. In this way, fuel is added to the fuel tank during a fueling event. In the description herein, a fueling event may also be referred to as a refueling event.

Thus, it may determined whether or not a fueling event thus is occurring based on whether or not the nozzle is inserted in the filler tube, and whether fuel is being added to the fuel tank. If the nozzle is inserted in the filler tube and/or fuel is being added to the fuel tank, then it may be determined at 708 that a fueling event is occurring. Determining whether or not the nozzle is inserted in the filler tube may be based on a position sensor (e.g., position sensor 316 shown in FIG. 3) disposed within the filler tube. In other examples, it may be determined whether or not the nozzle is inserted based on a position of a fuel tank cap (e.g., cap 318 shown in FIG. 3). It may determined whether or not fuel is being added to the fuel tank based on fuel level in tank. Thus, if the fuel level in the tank is increasing, then it may be determined that a fueling event is occurring.

If it is determined at 708 that a fueling event exists, then method 700 continues to 710, which comprises adjusting and/or maintaining the position of the vanes towards an open first position. Thus, in some examples, method 800 shown in FIG. 8, may be run as a subroutine of method 700 at 710. In other words, method 700 may execute method 800 at 710. After adjusting the vanes to the open first position, method 700 then returns.

Adjusting of the vanes may in some examples be passively controlled, and in other examples may be actively controlled. As described above with reference to FIGS. 2-5B, one or more of the vanes may be coupled to an actuator (e.g., actuator 193 shown in FIGS. 2-4, spring 504 shown in FIGS. 5A-5B, and actuator 503 shown in FIGS. 5A-5B). However, in other examples, the vanes may not be coupled to an actuator. In all examples the vanes may be pivotable, and therefore may be adjusted between the open first position and closed second position. An opening (e.g., opening 506 shown in FIG. 5A) formed between the vanes and the baffle may increase with increasing deflection of the vanes away from the closed second position towards the open first position.

In some examples where, the vanes are passively controlled, and the vanes are not coupled to an actuator, the vanes may be moved towards the open first position by a pressure force exerted on the vanes by fuel in a compartment (e.g., first compartment 176 shown in FIGS. 1 and 4) of the fuel tank, where the compartment may be formed between the baffle, and the filler tube. Said another way, during the fueling event, fuel entering the fuel tank may exert a pressure force on the vanes of the baffle. The pressure exerted by fuel acting against the vanes during the fueling may be sufficient to overcome a weight of the vanes, where the weight of the vanes may exert a closing force on said vanes, biasing the vanes towards the closed second position.

However in other examples, where the vanes may be passively controlled by the spring and/or other passive device (e.g., magnet), the vanes may be adjusted towards the open first position by a mechanical release of the vanes. Thus, upon insertion of the nozzle into the fuel tank, the vanes may be adjusted to the open first position by a mechanical release of the vanes. In some examples, the nozzle may provide a compressive force, which enables the mechanical release of the vanes. Thus, in some examples, where the vanes are coupled to one or more springs, the nozzle may provide a compressive force to the spring.

In still further examples, where the vanes are actively controlled, such as by an electromagnetic actuator (e.g., electromagnetic actuator 503 shown in FIG. 5A), the vanes may be adjusted to the open first position by the actuator. Specifically, the actuator may adjust the position of the vanes based on signals received from the controller, where the controller may send signals to the actuator for adjusting the vanes to the open first position in response to the nozzle being inserted into the filler tube.

Returning to 708, if it is determined that the fuel tank is not being fueled, then method 700 may proceed to 712, which comprises not purging the fuel vapor recovery system. Alternatively, method 700 may proceed to 712 if it is determined at 706, that the vehicle is moving. Method 700 may therefore proceed to 712 from either 706 if the vehicle is not stopped, or from 708 if the fuel tank is not being fueled. Thus, in some examples, the method 700 at 712 may comprise not purging a charcoal canister (e.g., canister 122 shown in FIG. 2), where the canister may be included in the fuel vapor recovery system. Specifically, the method 700 at 712 may comprise closing a CPV (e.g., CPV 164 shown in FIG. 2), and a CVV (e.g., CVV 120 shown in FIG. 2). Closing of the CPV and CVV may comprise adjusting the position to a fully closed position where gasses and/or fluids do not flow through the valves.

Method 700 may then continue from 712 to 726 which comprises determining if the fuel tank pressure is greater than a threshold. As described above the fuel tank pressure may be estimated based on outputs from the fuel tank pressure sensor. If the fuel tank pressure is greater than the threshold at 726, method 700 may continue to 728 which comprises routing fuel vapors from the fuel tank to the fuel vapor recovery system. Specifically, the method 700 at 728 may comprise routing fuel vapors from the fuel tank to the canister. In some examples, routing of the fuel vapors to the fuel vapor recovery system and/or the canister may comprise opening an FTIV (FTIV 124 shown in FIG. 2). Opening of the FTIV may comprise adjusting the position of the FTIV towards a more open position, where an opening formed by the FTIV may increase, and thereby an amount of fuel vapors flowing through the FTIV to the canister may increase. In some examples, the method 700 at 728 may additionally or alternatively comprise opening the CVV. Opening of the CVV may comprise adjusting the position of the CVV towards a more open position, so that an opening formed between an edge of the CVV and vent (e.g., vent 117) in which the CVV is positioned may increase, and therefore an amount of gasses flowing through the CVV may increase.

However, if it is determined at 726 that the fuel tank pressure is not greater than the threshold, method 700 may not route fuel vapors from the fuel tank to the canister, and may proceed directly to 730 from 726. As such, if the fuel tank pressure is not greater than the threshold at 726, method 700 may comprise closing the FTIV.

Method 700 may then proceed from 728 or from 726 if it determined at 726 that the fuel tank pressure is not greater than the threshold, to 730, which comprises adjusting and/or maintaining the vanes in the closed second position. In the closed second position, gasses and/or liquids may flow only through apertures (e.g., apertures 502 shown in FIGS. 5A-5B) in the vanes, when flowing through the baffle. Thus, when the vanes are in the closed second position, gasses and/or liquids may not flow through the baffle, except through the apertures. The vanes may be adjusted in a similar manner as described above at 710.

In some examples where, the vanes are passively controlled, and the vanes are not coupled to an actuator, the vanes may be moved towards the closed second position by a restraining force exerted on the vanes by a weight of the vanes. Said another way, gravity may exert the restoring force on the vanes, biasing the vanes towards the closed second position.

However in other examples, where the vanes may be passively controlled by the spring and/or other passive device (e.g., magnet), the vanes may be adjusted towards the closed second position by the restraining force of the passive device. In examples where the passive device is a spring, the spring may be more compressed in the open first position than in the closed second position. Thus, potential energy stored in the spring in the open first position may provide the restoring force, biasing the vanes towards the second closed position.

In still further examples, where the vanes are actively controlled, such as by an electromagnetic actuator (e.g., electromagnetic actuator 503 shown in FIG. 5A), the vanes may be adjusted to the closed second position by the actuator. Specifically, the actuator may adjust the position of the vanes based on signals received from the controller, where the controller may send signals to the actuator for adjusting the vanes to the closed second position when the fuel tank is not being fueled. After adjusting the vanes to the closed second position, method 700 may then return.

Returning to 704, if it is determined that the engine is on, method 700 may continue to 714 which comprises supplying fuel to the engine from the fuel tank based on the driver demanded torque. Fuel may be supplied to the engine from the fuel tank via a supply line (e.g., supply line 131 shown in FIGS. 2-4). More specifically, fuel may be pumped from the fuel tank to the engine from a fuel pump (e.g., pump 412 shown in FIG. 4) positioned in the fuel tank. The amount of fuel supplied to the engine may be based on the driver demanded torque and/or a position of the throttle valve, and a known air/fuel ratio, manifold air pressure, boost level, etc.

Next, the method 700 may continue from 714 to 716, which comprises determining if the canister loading is greater than a threshold. The canister loading level may be estimated based on a pressure in the canister, where the pressure in the canister may be estimated based on outputs of canister pressure sensor. If the canister load level is less than the threshold at 716, method 700 may not purge the canister, and may continue to 726. Further, not purging the canister may comprise closing the CPV. However, if the canister load is greater than the threshold at 716, method 700 may continue to 718 which comprises purging the fuel vapor recovery system. Purging the fuel vapor recovery system may comprise purging the canister.

As such, the method 700 at 718 may include one or more of opening the CPV at 720, opening the CVV at 722, and closing the FTIV at 724. Closing of the FTIV may comprise adjusting the position of the FTIV towards a more closed position, where an opening formed by the FTIV may decrease, and thereby an amount of fuel vapors flowing through the FTIV to the canister may decrease. In some examples, the FTIV may be adjusted to a fully closed position so that gasses do not flow through the FTIV. In some examples, the method 700 at 728 may additionally or alternatively comprise opening the CVV. Opening of the CPV may comprise adjusting the position of the CPV towards a more open position, so that an opening formed between an edge of the CPV and a purge conduit (e.g., conduit 119 shown in FIG. 2) in which the CPV is positioned may increase, and therefore an amount of gasses flowing through the CPV may increase.

Thus, in some examples, purging of the fuel vapor recovery system may comprise flowing fuel vapor gasses from the canister to an intake manifold (e.g., intake manifold 144 shown in FIG. 2) of the engine via the purge conduit. Additionally or alternatively, purging of the fuel vapor recovery system may comprise flowing fuel vapor gasses from the canister to an aspirator (e.g., aspirator 180 shown in FIG. 2) coupled across a compressor bypass conduit (e.g., bypass passage 186 shown in FIG. 2), via a purge bypass conduit (e.g., purge bypass conduit 123 shown in FIG. 2). After purging the fuel vapor recovery system at 718, method 700 may then continue to 726, and may proceed to one or more of 728 and 730 in the manner described above, before returning.

In this way, the method 700 may comprise adjusting the vanes depending on whether or not the fuel tank is being fueled. During fueling, the vanes may be adjusted to an open first position. However, when the fuel tank is not being fueled, the vanes may be adjusted to the closed second position. If the pressure in the fuel tank exceeds a threshold during vehicle operation, the fuel tank may release a portion of the fuel vapors to the fuel vapor recovery system. Additionally, the fuel vapor recovery system may periodically be purged to one or more of the intake manifold and/or aspirator depending on vacuum levels at each. Thus, when the canister loading exceeds a threshold, the engine is on, and vacuum in the intake manifold is sufficient to draw stored fuel vapors from the canister, the CPV may be opened to allow fuel vapors stored in the canister to be purged to the intake manifold.

Figure 8:
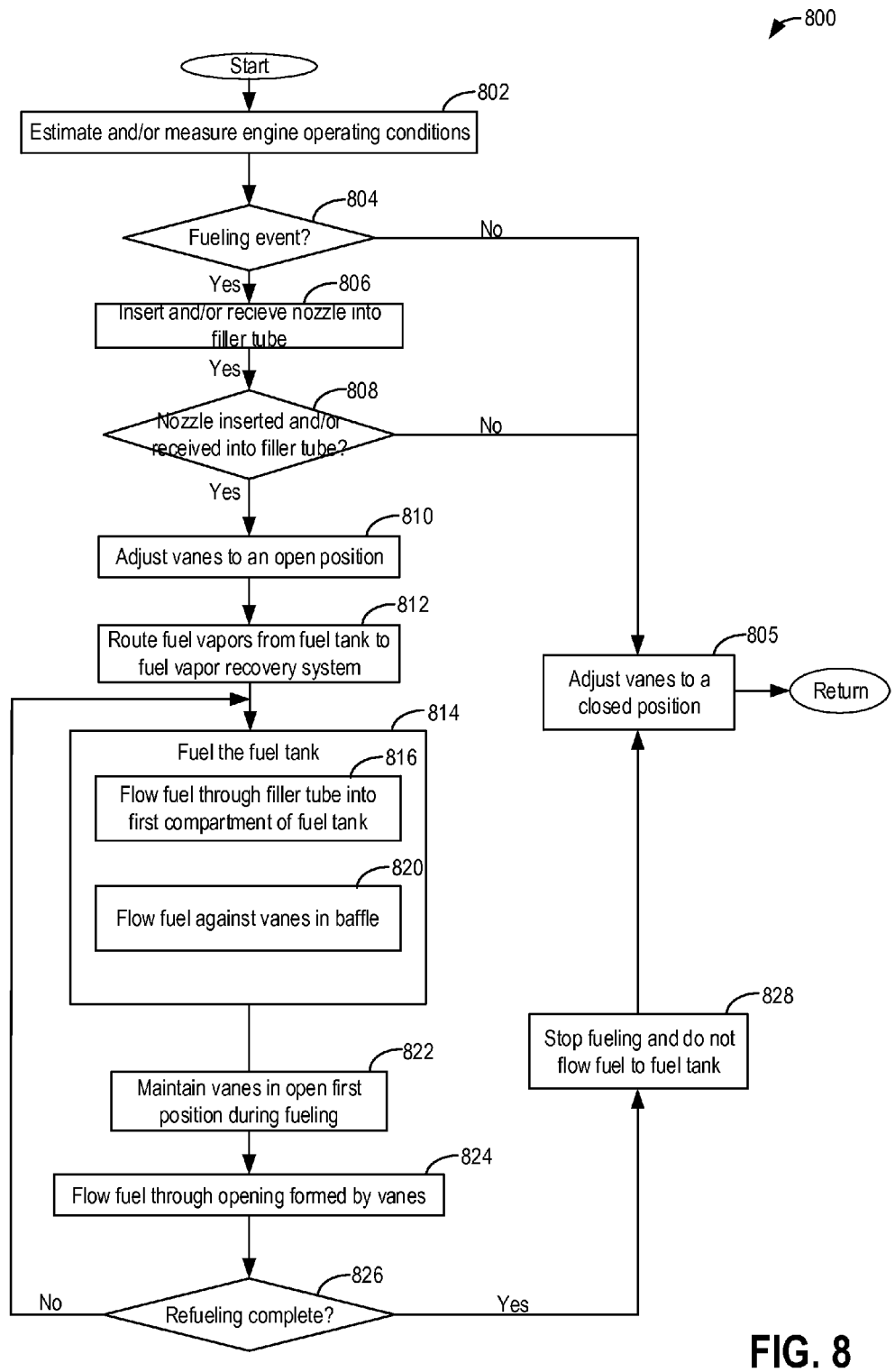
FIG. 8 shows a flow chart of a method for adjusting a position of one or more vanes of a baffle within a fuel tank based on engine operating conditions.

Moving on to FIG. 8, it shows an example method 800, for regulating the flow liquids and/or gasses in a fuel tank (e.g., fuel tank 126 shown in FIGS. 1-4). Specifically, method 800 is an example method which may be executed for regulating the flow of fuel and/or fuel vapors in the fuel tank, during a fueling event by adjusting a position of one or more vanes (e.g., vanes 194 shown in FIG. 2 and FIGS. 4-6B) included in a baffle (e.g., baffle 190 shown in FIG. 2 and FIGS. 4-6B). As such, method 800 may executed as a subroutine of method 700 described above with reference to FIG. 7 at 710. Method 800 may include maintaining the vanes in a closed second position so that fuel may only flow through the baffle via apertures (e.g., apertures 502 shown in FIGS. 5A-5B) positioned within one or more of the vanes, while one or more of an engine (e.g., engine 110 shown in FIGS. 1-2) is running, a vehicle system (e.g., vehicle system 100 shown in FIG. 1) is moving, etc. However, during a fueling event, where the engine is off, the vehicle system is not moving, and fuel is being added to the fuel tank, the vanes may be adjusted towards an open first position, away from the closed second position, to increase an opening in the baffle, and therefore increase an amount of fuel flowing through the baffle.

Method 800 may begin at 802 by estimating and/or measuring engine operating conditions. Engine operating conditions may include a fuel tank pressure as estimated based on outputs from a fuel tank pressure sensor (e.g., sensor 128 shown in FIG. 2), fuel level as estimated based on outputs from a fuel level sensor (e.g., fuel level sensor 173 shown in FIG. 2), a canister load as estimated based on outputs from a canister pressure sensor (e.g., sensor 138 shown in FIG. 2), a driver demanded torque as estimated based on input from a vehicle operator (e.g., vehicle operator 130 shown in FIGS. 1-2) via an input device (e.g., input device 132 shown in FIGS. 1-2), etc.

After estimating and/or measuring engine operating conditions, method 800 may proceed to 804 which comprises determining if a fueling event is occurring and/or is desired in a similar manner as described above at 708 of method 700 in FIG. 7. If a fueling event is not occurring and/or is not desired at 804, method 800 may proceed to 805 which comprises adjusting the vanes to a closed second position in the manner described at 730 of method 700 in FIG. 7. Method 800 then returns.

However, if it is determined that a fueling event is desired at 804, then method 800 may continue to 806 which comprise inserting and/or receiving a nozzle (e.g., nozzle 170 shown in FIGS. 1-2) into a filler tube (e.g., filler tube 310 shown in FIGS. 3-4). After inserting the nozzle into the filler tube, and/or receiving of the nozzle at 806, method 800 may proceed to 808 which comprises checking to see if the nozzle was inserted and/or received into the filler tube. If the nozzle is not inserted into the filler tube, then method 800 may proceed to 805 and adjust the vanes to the closed second position. However, if the nozzle is inserted into the filler tube, then method 800 may proceed to 810 which comprises adjusting the vanes to an open first position in the manner described above at 710 of method 700 in FIG. 7.

Upon adjusting of the vanes to the open first position at 810, method 800 may then continue to 812 which comprises routing fuel vapors from the fuel tank to the fuel vapor recovery system (e.g., fuel vapor recovery system 140 shown in FIG. 2). The method at 812 may therefore comprise routing fuel vapors from the fuel tank to canister (e.g., canister 122 shown in FIG. 2). Specifically, the method 800 at 812 may comprise opening an FTIV (e.g., FTIV 124 shown in FIG. 2) and flowing fuel vapors from the fuel tank to the canister. Further, the method at 810, may additionally or alternatively comprise opening a CPV (e.g., CPV 164 shown in FIG. 2) in the manner described at 720 of method 700 in FIG. 7. Additionally or alternatively, the method 800 at 810 may comprise closing a CVV (e.g., CVV 120 shown in FIG. 2).

The method 800 may then proceed to 814 which comprises fueling the fuel tank. Thus, after inserting the nozzle into the filler tube, the method 800 may comprise fueling the fuel tank. Fueling of the fuel tank may comprise flowing fuel through the filler tube into a first compartment (e.g., first compartments 176 shown in FIGS. 2, 4) of the fuel tank at 816. The first compartment may be a portion of the fuel tank defined between where the filler tube enters the fuel tank, and the baffle comprising the pivotable vanes. Additionally or alternatively, fueling the fuel tank may comprise flowing fuel against vanes in the baffle at 820, after flowing fuel into the fuel tank through the filler tube.

Method 800 may then continue to 822 which comprises maintaining the vanes in the open first position during the fueling. Thus, during the fueling, in response to the nozzle being inserted into the filler tube, the vanes may be maintained in the open first position. In some examples, the vanes may be maintained in the open first position by a force of the fuel in the fuel tank exerted on the vanes which may be greater than a weight of the vanes. In other examples, the vanes may be maintained in the open first position by a mechanical release of the vanes. In still further examples, the vanes may be maintained in the open first position by an electro-mechanical release of the vanes.

In some examples, method 800 may additionally comprise flowing fuel though openings (e.g., openings 506 shown in FIG. 5A) formed between the vanes and the baffle at 824. Thus, as described above with reference to FIG. 5A, the openings may provide fluidic communication through the baffle, when the vanes are adjusted to the open first position. As such, during fueling, the method 800 at 824 may comprise flowing fuel through the filler tube into the fuel tank, against the vanes of the baffle, and upon adjusting of the vanes to the open first position, the method 800 may additionally comprise flowing fuel through the openings formed between the vanes and the baffle. Further fuel may flow through the openings, through the baffle, and into a second compartment (e.g., second compartment 178 shown in FIGS. 1, 4) formed on the opposite side of the baffle in the fuel tank.

Next, method 800 may continue to 826 which comprises determining if the refueling of the fuel tank is complete, which may be based on one or more of the pressure in the fuel tank, an amount of fuel in the fuel tank as estimated based on outputs from the fuel level sensor, etc. Thus, fueling may be complete if the pressure in the fuel tank reaches a threshold, and/or if the fuel level in the fuel tank reaches a threshold fuel level. If fueling of the fuel tank is not complete, method 800 may return to 814 and continue to fuel the fuel tank. If fueling of the fuel tank is complete, then method 800 may continue to 828 which comprises stopping fueling of the fuel tank, and not flowing fuel to the fuel tank. Thus, at 828, fuel may no longer flow into the filler tube. Method 800 then returns.

In one representation, a method may comprise fueling a fuel tank by receiving a nozzle into a filler tube which extends into a fuel tank to fuel the fuel tank, and directing fuel through said tube against vanes in a baffle which forms a compartment within said tank, and during said fueling, the method may comprise enabling said vanes to open so that pressure within said compartment remains below a level which may otherwise cause shut off said nozzle. In some examples, enabling said vanes to open may comprise a mechanical release of said vanes in response to insertion of said nozzle. Enabling said vanes to open may comprise an electro-mechanical release of said vanes by a relay in response to insertion of said nozzle. In other examples, enabling said vanes to open may comprise pressure exerted by said fuel acting against said vanes during said fueling which is sufficient to overcome a weight of said vanes exerting a closing force on said vanes. The vanes may be positioned in a closed position when said fueling is not occurring. Additionally or alternatively, the method may comprise supplying said fuel from said tank to an engine driving a motor vehicle. The vanes may remain closed while said motor vehicle is in motion.

In another representation, a method may comprise fueling a fuel tank by receiving a nozzle into a filler tube which extends into said tank and directing fuel through said tube against vanes in a baffle which forms a compartment within said tank, said vanes including a plurality of holes to allow a portion of said fuel to flow therethrough, during said fueling, enabling said vanes to open so that pressure within said compartment remains below a level which would otherwise cause shut off said nozzle, routing fuel vapors from said tank into a fuel vapor recovery system, supplying said fuel from said tank to an internal combustion engine, and periodically purging at least a portion of said fuel vapors from said tank and said fuel vapor recovery system into said engine. The internal combustion may drive a motor vehicle and said baffle may reduce sloshing of said fuel and generation of said fuel vapors while said motor vehicle is being driven. Additionally or alternatively, an electric motor may be utilized for periodically driving said motor vehicle. In some examples, enabling said vanes to open may comprise a mechanical release of said vanes in response to insertion of said nozzle. In other examples, enabling said vanes to open may comprise an electro-mechanical release of said vanes by a relay in response to insertion of said nozzle. In yet further examples, enabling said vanes to open may comprise pressure exerted by said fuel acting against said vanes during said fueling which may be sufficient to overcome a weight of said vanes exerting a closing force on said vanes In this way, a method may comprise during fueling of a fuel tank, inserting a nozzle into a filler tube of the fuel tank, and flowing fuel into the filler tube in route to the fuel tank. Further, the method may comprise flowing the fuel into the fuel tank, against pivotable vanes included in a baffle of the fuel tank, the baffle defining a compartment within the fuel tank. The vanes may be adjusted between an open first position and a closed second position. In the closed second position, fuel may only flow through the baffle through apertures in the vanes. Thus, fuel may not flow through the baffle, when the vanes are in the closed second position, except through the apertures. However, as the vanes are adjusted towards the open first position, an opening may form between the vanes and the baffle, where the size of the opening may increase with increasing deflection of the vanes away from the closed second position towards the open first position.

Thus, the method may comprise adjusting the vanes to the open first position during fueling, so that fuel flowing into the compartment of the fuel tank may flow against the vanes, through the openings formed by the vanes and the baffle, through the baffle, and into a second compartment of the fuel tank. In this way, fuel flow through the baffle during fueling may be increased. Further, opening the vanes during fueling may reduce pressure in the first compartment. A first technical effect of increasing the fuel capacity of the fuel tank is achieved by reducing pressure in the fuel tank during fueling by adjusting the vanes to the open first position. By reducing the pressure in the tank, fuel levels in the tank may reach higher levels before fuel from the nozzle is shut off. A second technical effect of reducing loading of a fuel vapor canister is achieved by reducing vapor pressure in the tank by adjusting the vanes to the open first position.

However, when the fuel tank is not being refueled, the vanes may be adjusted to the closed second position, so that fuel flow through the baffle may be limited by the apertures. In this way, after fueling of the fuel tank, and during acceleration which may cause movement of the fuel within the fuel tank, the sloshing of fuel in the fuel tank may be reduced. Thus, a technical effect of reducing noise generated in the fuel tank from fuel impacting walls of the fuel tank is achieved by adjusting the vanes to a closed second position when the fuel tank is not being fueled. In this way, by including pivotable vanes in one or more baffles of a fuel tank, sound generated from the fuel tank may be reduced, while the storage capacity of the fuel tank may be increased, and loading of a charcoal canister may be reduced. Thus, premature fuel shutoffs at fuel tank refueling may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
receiving a nozzle into a filler tube which extends into a fuel tank to fuel the fuel tank, and directing fuel through said tube against vanes in a baffle which forms a compartment within said tank; and
during said fueling, enabling said vanes to open so that pressure within said compartment remains below a level which would otherwise cause shut off said nozzle, wherein enabling said vanes to open comprises a mechanical release of said vanes in response to insertion of said nozzle.

2. The method recited in claim 1, wherein said enabling said vanes to open comprises an electro-mechanical release of said vanes by a relay in response to insertion of said nozzle.

3. The method recited in claim 1, wherein said enabling said vanes to open comprises pressure exerted by said fuel acting against said vanes during said fueling which is sufficient to overcome a weight of said vanes exerting a closing force on said vanes.

4. The method recited in claim 1, wherein said vanes are positioned in a closed position when said fueling is not occurring.

5. The method recited in claim 4, further comprising supplying said fuel from said tank to an engine driving a motor vehicle.

6. The method recited in claim 5, wherein said vanes remain closed while said motor vehicle is in motion.

7. A method, comprising:
fueling a fuel tank by receiving a nozzle into a filler tube which extends into said tank and directing fuel through said tube against vanes in a baffle which forms a compartment within said tank, said vanes including a plurality of holes to allow a portion of said fuel to flow therethrough;
during said fueling, enabling said vanes to open so that pressure within said compartment remains below a level which would otherwise shut off said nozzle, wherein said enabling said vanes to open comprises a mechanical release of said vanes in response to insertion of said nozzle;
routing fuel vapors from said tank into a fuel vapor recovery system;
supplying said fuel from said tank to an internal combustion engine; and periodically purging at least a portion of said fuel vapors from said tank and said fuel vapor recovery system into said internal combustion engine.

8. The method recited in claim 7, wherein said internal combustion engine drives a motor vehicle and said baffle reduces sloshing of said fuel and generation of said fuel vapors while said motor vehicle is being driven.

9. The method recited in claim 8, further comprising an electric motor for periodically driving said motor vehicle.

10. The method recited in claim 7, wherein said enabling said vanes to open comprises an electro-mechanical release of said vanes by a relay in response to insertion of said nozzle.

11. The method recited in claim 7, wherein said enabling said vanes to open comprises pressure exerted by said fuel acting against said vanes during said fueling which is sufficient to overcome a weight of said vanes exerting a closing force on said vanes.

\* \* \* \* \*